(12) United States Patent
Yang

(10) Patent No.: US 10,893,204 B2
(45) Date of Patent: Jan. 12, 2021

(54) PHOTOGRAPHY COMPOSITION GUIDING METHOD AND APPARATUS

(71) Applicant: Huawei Technologies Co., Ltd., Shenzhen (CN)

(72) Inventor: Fan Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 33 days.

(21) Appl. No.: 16/360,922

(22) Filed: Mar. 21, 2019

(65) Prior Publication Data

US 2019/0222772 A1 Jul. 18, 2019

Related U.S. Application Data

(63) Continuation of application No. PCT/CN2016/107110, filed on Nov. 24, 2016.

(51) Int. Cl.
| | |
|---|---|
| H04N 5/232 | (2006.01) |
| H04N 5/225 | (2006.01) |
| G06T 7/73 | (2017.01) |
| G06T 5/00 | (2006.01) |
| G06T 5/50 | (2006.01) |
| G06T 7/90 | (2017.01) |
| G06T 7/60 | (2017.01) |

(52) U.S. Cl.
CPC ....... H04N 5/232945 (2018.08); G06T 5/006 (2013.01); G06T 5/50 (2013.01); G06T 7/73 (2017.01); H04N 5/2258 (2013.01); H04N 5/23222 (2013.01); H04N 5/23229 (2013.01); H04N 5/23296 (2013.01); H04N 5/232933 (2018.08); H04N 5/232935 (2018.08); G06T 7/60 (2013.01); G06T 7/90 (2017.01)

(58) Field of Classification Search
CPC ................................................. H04N 5/23222
USPC ..................................................... 348/333.02
See application file for complete search history.

(56) References Cited

U.S. PATENT DOCUMENTS 6,816,847 B1 11/2004 Toyama
7,417,672 B2 8/2008 Nakajima et al.
(Continued)

FOREIGN PATENT DOCUMENTS

| CN | 102957859 A | 3/2013 |
| CN | 103049175 A | 4/2013 |

(Continued)

OTHER PUBLICATIONS

Foreign Communication From a Counterpart Application, Chinese Application No. 201680086153.X, Chinese Office Action dated Sep. 23, 2019, 8 pages.

(Continued)

*Primary Examiner* — Anthony J Daniels
(74) *Attorney, Agent, or Firm* — Conley Rose, P.C.

(57) ABSTRACT

A photographing preview composition guiding method includes obtaining a first image in a photographing preview mode of a photographing device, determining a target photographing object in the first image, obtaining a second image, where the second image includes the target photographing object, and the second image and the first image correspond to different angles of view, constructing a third image based on the first image and the second image, and displaying a composition prompt of the third image in a photographing preview interface.

20 Claims, 8 Drawing Sheets

(56) References Cited

U.S. PATENT DOCUMENTS

| | | |
|---|---|---|
| 8,508,622 B1 | 8/2013 | Anon |
| 9,191,571 B2 | 11/2015 | Nakai et al. |
| 2005/0200722 A1 | 9/2005 | Ono |
| 2008/0030592 A1 | 2/2008 | Border et al. |
| 2009/0195666 A1 | 8/2009 | Chen et al. |
| 2009/0278958 A1 | 11/2009 | Bregman-Amitai et al. |
| 2010/0290705 A1* | 11/2010 | Nakamura ......... H04N 5/23229 382/173 |
| 2012/0026364 A1* | 2/2012 | Kuma ................. H04N 5/2258 348/231.99 |
| 2013/0040700 A1 | 2/2013 | Nishikawa |
| 2013/0155293 A1* | 6/2013 | Lee ................... H04N 5/23238 348/240.2 |
| 2013/0293746 A1 | 11/2013 | Iki |
| 2015/0109507 A1 | 4/2015 | Li et al. |
| 2017/0150039 A1* | 5/2017 | Jeong .................... H04N 5/232 |
| 2017/0344955 A1 | 11/2017 | Kim et al. |
| 2017/0374246 A1* | 12/2017 | Wang .................. H04N 5/2257 |
| 2018/0220066 A1* | 8/2018 | Kitamura ................ G06T 7/248 |
| 2018/0367752 A1* | 12/2018 | Donsbach .......... G06K 9/00221 |

FOREIGN PATENT DOCUMENTS

| | | |
|---|---|---|
| CN | 103384304 A | 11/2013 |
| CN | 104079812 A | 10/2014 |
| CN | 104243814 A | 12/2014 |
| CN | 105323491 A | 2/2016 |
| CN | 105991915 A | 10/2016 |
| CN | 106060386 A | 10/2016 |
| EP | 2163103 A1 | 3/2010 |
| EP | 2683154 A2 | 1/2014 |
| WO | 2009001255 A1 | 12/2008 |
| WO | 2016085139 A1 | 6/2016 |

OTHER PUBLICATIONS

Machine Translation and Abstract of Chinese Publication CN104079812, Oct. 1, 2014, 20 pages.

Machine Translation and Abstract of Chinese Publication CN104243814, Dec. 24, 2014, 28 pages.

Machine Translation and Abstract of Chinese Publication CN105323491, Feb. 10, 2016, 36 pages.

Machine Translation and Abstract of Chinese Publication CN105991915, Oct. 5, 2016, 15 pages.

Machine Translation and Abstract of Chinese Publication CN106060386, Oct. 26, 2016, 21 pages.

Liu, L., et al., "Optimizing Photo Composition," Eurographics, vol. 29, No. 2, 2010, 10 pages.

Foreign Communication From a Counterpart Application, PCT Application No. PCT/CN2016/107110, English Translation of International Search Report dated Aug. 30, 2017, 2 pages.

Foreign Communication From a Counterpart Application, European Application No. 16922085.2, Extended European Search Report dated Jun. 3, 2019, 11 pages.

* cited by examiner

PHOTOGRAPHY COMPOSITION GUIDING METHOD AND APPARATUS

CROSS-REFERENCE TO RELATED APPLICATIONS

This application is a continuation of International Patent Application No. PCT/CN2016/107110 filed on Nov. 24, 2016, which is hereby incorporated by reference in its entirety.

TECHNICAL FIELD

The present application relates to the field of image processing, and in particular, to a photography composition guiding method and an apparatus.

BACKGROUND

With continuous development and popularity of photographing devices and help of We Media, photographing has become a part of people's daily life. However, most users have no professional photographing skills, and cannot properly use photographing means such as composition and setting parameters to take a high-quality photo.

A digital photographing device currently supports intelligent settings of various photosensitive parameters, and the photosensitive parameters may be automatically adjusted during photographing. However, for photography composition, most photographing devices add only auxiliary lines such as "nine square grids" or "diagonal" to a viewfinder frame or a display screen to assist a user in composition, and this method assists the user only in slightly adjusting photography composition when the user determines a rough photographing range. Particularly, when the user has no basic knowledge about photography composition, even if the foregoing function of facilitating composition using auxiliary lines is enabled, the user cannot perform composition well.

SUMMARY

Embodiments of the present application provide a photography composition guiding method and an apparatus to automatically select a preferred photographing range and composition manner for a user or prompt the user with the preferred photographing range and composition manner. Even if the user has no basic knowledge about photography composition, the user can obtain auxiliary photography composition according to solutions provided in the embodiments of the present application.

A first aspect of the embodiments of the present application provides a photographing preview composition guiding method, including obtaining a first image in a photographing preview mode of a photographing device, determining a target photographing object in the first image, obtaining a second image, where the second image includes the target photographing object, the second image and the first image correspond to different angles of view, and the angle of view is used to indicate a photographing range of the photographing device, constructing a third image based on the first image and the second image, where the third image includes the target photographing object, and an angle of view corresponding to the third image is the same as a smaller angle of view in the angles of view corresponding to the first image and the second image, and displaying a composition prompt of the third image in a photographing preview interface.

A beneficial effect of the foregoing embodiment of the present application is as follows. Image information of different angles of view is obtained, and image information around a current photographing range is introduced for reference in order to more properly select a photographing range and a composition manner, avoid causing a new framing problem after the photographing range is adjusted, and avoid a plurality of adjustments made by a user to avoid a framing problem.

According to the first aspect of the embodiments of the present application, in a first feasible implementation of the first aspect of the embodiments of the present application, the photographing device has at least two lenses, the first image is obtained by a first lens of the photographing device with a first focal length, the second image is obtained by a second lens of the photographing device with a second focal length, and the first focal length is different from the second focal length.

According to the first aspect or the first feasible implementation of the first aspect of the embodiments of the present application, in a second feasible implementation of the first aspect of the embodiments of the present application, the photographing device simultaneously obtains the first image and the second image.

A beneficial effect of the foregoing embodiment of the present application is as follows. Image information of different angles of view is simultaneously obtained such that real-time quality of image processing is improved, image content inconsistency caused by inconsistent obtaining times is reduced, and accuracy of image selection is improved.

According to any one of the first aspect to the second feasible implementation of the first aspect of the embodiments of the present application, in a third feasible implementation of the first aspect of the embodiments of the present application, determining a target photographing object in the first image includes determining the target photographing object based on first information entered by a user, or determining the target photographing object based on a first preset feature.

According to the third feasible implementation of the first aspect of the embodiments of the present application, in a fourth feasible implementation of the first aspect of the embodiments of the present application, the first information includes a location point in the first image, or an area in the first image, or one or more image features that can be identified by the photographing device.

According to the third or the fourth feasible implementation of the first aspect of the embodiments of the present application, in a fifth feasible implementation of the first aspect of the embodiments of the present application, the first preset feature includes at least one of preset information about a location of the to-be-determined target photographing object in the first image, preset information about an image area occupied by the to-be-determined target photographing object in the first image, a preset geometric feature of the to-be-determined target photographing object, a preset color feature of the to-be-determined target photographing object, or preset attribute information of the to-be-determined target photographing object.

A beneficial effect of the foregoing embodiment of the present application is as follows. The target photographing object is determined by interacting with the user such that accuracy of determining the target photographing object is improved, or the target photographing object is determined through automatic feature recognition of the photographing device such that user convenience is improved.

According to any one of the first aspect to the fifth feasible implementation of the first aspect of the embodiments of the present application, in a sixth feasible implementation of the first aspect of the embodiments of the present application, a large angle of view image is an image that is in the first image and the second image and that is corresponding to a larger angle of view, a small angle of view image is an image that is in the first image and the second image and that is corresponding to the smaller angle of view, and constructing a third image based on the first image and the second image includes determining a shape and a size of the third image based on the large angle of view image and the small angle of view image, searching, using the shape and the size of the third image as a shape and a size of a search window, the large angle of view image for at least one candidate image that meets a preset condition, and determining the candidate image as the third image when there is one candidate image, and selecting one candidate image as the third image when there are more than one candidate image.

According to the sixth feasible implementation of the first aspect of the embodiments of the present application, in a seventh feasible implementation of the first aspect of the embodiments of the present application, determining a shape and a size of the third image based on the large angle of view image and the small angle of view image includes determining that the shape of the third image is the same as a shape of the small angle of view image obtained after image distortion correction, determining a proportionality coefficient of a size of the small angle of view image relative to a size of the large angle of view image based on a proportional relationship between the first focal length and the second focal length and based on the angles of view respectively corresponding to the large angle of view image and the small angle of view image, and zooming in/out the size of the small angle of view image according to the proportionality coefficient, to obtain the size of the third image.

A beneficial effect of the foregoing embodiment of the present application is as follows. Image information of different angles of view is obtained, and image information around a current photographing range is introduced for reference in order to more properly select a photographing range and a composition manner, avoid causing a new framing problem after the photographing range is adjusted, and avoid a plurality of adjustments made by a user to avoid a framing problem.

According to the sixth or the seventh feasible implementation of the first aspect of the embodiments of the present application, in an eighth feasible implementation of the first aspect of the embodiments of the present application, before the determining a shape and a size of the third image based on the large angle of view image and the small angle of view image, the method further includes performing image distortion correction on the first image and the second image, where correspondingly the large angle of view image is an image that is in the first image and the second image obtained after image distortion correction and that is corresponding to the larger angle of view, and the small angle of view image is an image that is in the first image and the second image obtained after image distortion correction and that is corresponding to the smaller angle of view.

A beneficial effect of the foregoing embodiment of the present application is as follows. Image distortion correction is performed before an image is processed such that shapes and sizes of search windows corresponding to different locations in the large angle of view image are unified, image processing efficiency and accuracy are improved, and a more accurate image composition score can be obtained compared with a case in which image distortion correction is not performed.

According to any one of the sixth to the eighth feasible implementations of the first aspect of the embodiments of the present application, in a ninth feasible implementation of the first aspect of the embodiments of the present application, the preset condition includes that the candidate image includes the target photographing object, and a comprehensive score of the candidate image is higher than a preset threshold, where the comprehensive score of the candidate image is positively correlated to a composition score of the candidate image, and is negatively correlated to a degree of impact of an interfering object in the candidate image on the candidate image.

According to the ninth feasible implementation of the first aspect of the embodiments of the present application, in a tenth feasible implementation of the first aspect of the embodiments of the present application, the composition score of the candidate image includes a degree of conformity of a composition manner of the candidate image with at least one of composition rules a rule of thirds, nine square grid composition, balanced composition, triangle composition, vertical composition, S-type composition, frame composition, diagonal composition, radial composition, open composition, vanishing point composition, face-priority composition, color composition, depth of field composition, or scene composition in a photography composition method.

A beneficial effect of the foregoing embodiment of the present application is as follows. A scoring system is used to automatically provide a direct preferred composition manner for a user to perform composition such that user experience is improved.

According to the ninth or the tenth feasible implementation of the first aspect of the embodiments of the present application, in an eleventh feasible implementation of the first aspect of the embodiments of the present application, the degree of the impact of the interfering object in the candidate image on the candidate image includes at least one of an image area covered by the interfering object in the candidate image, a ratio of the image area covered by the interfering object in the candidate image to an image area of the candidate image, a ratio of the image area covered by the interfering object in the candidate image to an image area covered by the target photographing object in the candidate image, a location of the interfering object in the candidate image, a location of the interfering object relative to the target photographing object, or a preset degree of incompatibility between the candidate image and the interfering object.

According to the eleventh feasible implementation of the first aspect of the embodiments of the present application, in a twelfth feasible implementation of the first aspect of the embodiments of the present application, the preset degree of incompatibility between the candidate image and the interfering object includes a color correlation or difference between the interfering object and the candidate image, or a physical attribute correlation or difference between the interfering object and an object in the candidate image.

According to any one of the ninth to the twelfth feasible implementations of the first aspect of the embodiments of the present application, in a thirteenth feasible implementation of the first aspect of the embodiments of the present application, the preset threshold includes a preset fixed value, or a variable value determined based on at least one of resolution of the candidate image or a size of the candidate image, where the variable value is positively correlated to each of the resolution of the candidate image and the size of the candidate image.

According to the thirteenth feasible implementation of the first aspect of the embodiments of the present application, in a fourteenth feasible implementation of the first aspect of the embodiments of the present application, the preset fixed value includes a preset value corresponding to a photographing scene, or a preset value corresponding to a physical attribute of the target photographing object, or a preset value corresponding to an execution time of the photographing preview mode, where the execution time is negatively correlated to the preset value corresponding to the execution time.

According to any one of the sixth to the fourteenth feasible implementations of the first aspect of the embodiments of the present application, in a fifteenth feasible implementation of the first aspect of the embodiments of the present application, before searching the large angle of view image for at least one candidate image that meets a preset condition, the method further includes determining the interfering object in the large angle of view image.

According to the fifteenth feasible implementation of the first aspect of the embodiments of the present application, in a sixteenth feasible implementation of the first aspect of the embodiments of the present application, determining the interfering object in the large angle of view image includes determining the interfering object based on second information entered by the user, or determining the interfering object based on a second preset feature.

According to the sixteenth feasible implementation of the first aspect of the embodiments of the present application, in a seventeenth feasible implementation of the first aspect of the embodiments of the present application, the second information includes a location point in the large angle of view image, or an area in the large angle of view image, or one or more image features that can be identified by the photographing device.

According to the sixteenth or the seventeenth feasible implementation of the first aspect of the embodiments of the present application, in an eighteenth feasible implementation of the first aspect of the embodiments of the present application, the second preset feature includes at least one of preset information about a location of the to-be-determined interfering object in the large angle of view image, preset information about an image area occupied by the to-be-determined interfering object in the large angle of view image, a preset geometric feature of the to-be-determined interfering object, a preset color feature of the to-be-determined interfering object, or preset attribute information of the to-be-determined interfering object.

A beneficial effect of the foregoing embodiment of the present application is as follows. Impact of the interfering object on the composition manner is considered such that a disadvantage of a conventional composition scoring system is overcome, and a preferred composition manner is recommended to the user.

According to any one of the sixth to the eighteenth feasible implementations of the first aspect of the embodiments of the present application, in a nineteenth feasible implementation of the first aspect of the embodiments of the present application, selecting one candidate image as the third image when there are more than one candidate image includes selecting a candidate image with a highest comprehensive score as the third image, or selecting the third image based on third information entered by the user, or selecting a candidate image closest to or farthest from a mapping location of the small angle of view image in the large angle of view image as the third image, or selecting, as the third image, a candidate image that the user has lowest operation difficulty in obtaining, where the operation difficulty is determined based on at least one of angles at which the user rotates the photographing device in a horizontal direction or in a vertical direction using a midline of the photographing device as an axis and an angle at which the user rotates the photographing device using a lens optical center direction as an axis.

According to the nineteenth feasible implementation of the first aspect of the embodiments of the present application, in a twentieth feasible implementation of the first aspect of the embodiments of the present application, when at least two candidate images have a same comprehensive score, selecting one candidate image as the third image includes selecting a candidate image with a highest composition score as the third image, selecting a candidate image whose interfering object has lowest degree of impact on the candidate image as the third image, selecting a candidate image closest to or farthest from the mapping location of the small angle of view image in the large angle of view image as the third image, or selecting, as the third image, a candidate image that the user has lowest operation difficulty obtaining.

A beneficial effect of the foregoing embodiment of the present application is as follows. A plurality of methods for determining a photographing range are provided for the user from different perspectives such that user experience is improved, and a personalized requirement of the user is fully considered when auxiliary composition is provided for the user.

According to any one of the sixth to the twentieth feasible implementations of the first aspect of the embodiments of the present application, in a twenty-first feasible implementation of the first aspect of the embodiments of the present application, displaying a composition prompt of the third image in a photographing preview interface includes displaying the small angle of view image and first prompt information in the photographing preview interface, where the first prompt information is information used to instruct the user to move the photographing range to a photographing range of the third image.

According to the twenty-first feasible implementation of the first aspect of the embodiments of the present application, in a twenty-second feasible implementation of the first aspect of the embodiments of the present application, the image displayed in the photographing preview interface varies with the photographing range in real time.

According to any one of the sixth to the twentieth feasible implementations of the first aspect of the embodiments of the present application, in a twenty-third feasible implementation of the first aspect of the embodiments of the present application, displaying a composition prompt of the third image in a photographing preview interface includes displaying the large angle of view image, the third image, a mapped image of the small angle of view image in the large angle of view image, and second prompt information in the photographing preview interface, where the second prompt information is information used to instruct the user to move the photographing range from the mapped image to a photographing range of the third image.

According to the twenty-third feasible implementation of the first aspect of the embodiments of the present application, in a twenty-fourth feasible implementation of the first aspect of the embodiments of the present application, instruction information of the mapped image displayed in the photographing preview interface varies with the photographing range in real time.

According to the twenty-third or the twenty-fourth feasible implementation of the first aspect of the embodiments of the present application, in a twenty-fifth feasible implementation of the first aspect of the embodiments of the present application, when the photographing range is moved to overlap with the photographing range corresponding to the third image, the method further includes displaying only the third image in the photographing preview interface.

A beneficial effect of the foregoing embodiment of the present application is as follows. A direct and easy-to-understand composition guide is provided for the user, and a real-time dynamic guide is provided for the user in a process in which the user adjusts the photographing range such that user experience and operation convenience are improved.

According to any one of the first aspect to the twenty-fifth feasible implementation of the first aspect of the embodiments of the present application, in a twenty-sixth feasible implementation of the first aspect of the embodiments of the present application, after displaying a composition prompt of the third image in a photographing preview interface, the method includes repeatedly performing, by the photographing device, photographing preview composition guiding according to preset frequency.

A beneficial effect of the foregoing embodiment of the present application is as follows. The user may make an adjustment based on an actual requirement and a real-time change of a photographing object such that accuracy of a composition guide is improved.

A second aspect of the embodiments of the present application provides a photographing device, used for preview composition guiding and including a first photographing module configured to obtain a first image in a photographing preview mode, a first determining module configured to determine a target photographing object in the first image, a second photographing module configured to obtain a second image, where the second image includes the target photographing object, the second image and the first image correspond to different angles of view, and the angle of view is used to indicate a photographing range of the photographing device, a processing module configured to construct a third image based on the first image and the second image, where the third image includes the target photographing object, and an angle of view corresponding to the third image is the same as a smaller angle of view in the angles of view corresponding to the first image and the second image, and a display module configured to display a composition prompt of the third image in a photographing preview interface.

According to the second aspect of the embodiments of the present application, in a first feasible implementation of the second aspect of the embodiments of the present application, the photographing device has at least two lenses, the first image is obtained by a first lens of the photographing device with a first focal length, where the first lens is located in the first photographing module, and the second image is obtained by a second lens of the photographing device with a second focal length, where the second lens is located in the second photographing module, and the first focal length is different from the second focal length.

According to the second aspect or the first feasible implementation of the second aspect of the embodiments of the present application, in a second feasible implementation of the second aspect of the embodiments of the present application, the photographing device simultaneously obtains the first image and the second image.

According to any one of the second aspect to the second feasible implementation of the second aspect of the embodiments of the present application, in a third feasible implementation of the second aspect of the embodiments of the present application, the first determining module is further configured to determine the target photographing object based on first information entered by a user, or determine the target photographing object based on a first preset feature.

According to the third feasible implementation of the second aspect of the embodiments of the present application, in a fourth feasible implementation of the second aspect of the embodiments of the present application, the first information includes a location point in the first image, or an area in the first image, or one or more image features that can be identified by the photographing device.

According to the third or the fourth feasible implementation of the second aspect of the embodiments of the present application, in a fifth feasible implementation of the second aspect of the embodiments of the present application, the first preset feature includes at least one of preset information about a location of the to-be-determined target photographing object in the first image, preset information about an image area occupied by the to-be-determined target photographing object in the first image, a preset geometric feature of the to-be-determined target photographing object, a preset color feature of the to-be-determined target photographing object, or preset attribute information of the to-be-determined target photographing object.

According to any one of the second aspect to the fifth feasible implementation of the second aspect of the embodiments of the present application, in a sixth feasible implementation of the second aspect of the embodiments of the present application, a large angle of view image is an image that is in the first image and the second image and that is corresponding to a larger angle of view, a small angle of view image is an image that is in the first image and the second image and that is corresponding to the smaller angle of view, and the processing module includes a second determining module configured to determine a shape and a size of the third image based on the large angle of view image and the small angle of view image, a searching module configured to search, using the shape and the size of the third image as a shape and a size of a search window, the large angle of view image for at least one candidate image that meets a preset condition, and a third determining module configured to determine the candidate image as the third image when there is one candidate image, and select one candidate image as the third image when there are more than one candidate image.

According to the sixth feasible implementation of the second aspect of the embodiments of the present application, in a seventh feasible implementation of the second aspect of the embodiments of the present application, the second determining module is further configured to determine that the shape of the third image is the same as a shape of the small angle of view image obtained after image distortion correction, determine a proportionality coefficient of a size of the small angle of view image relative to a size of the large angle of view image based on a proportional relationship between the first focal length and the second focal length and based on the angles of view respectively corresponding to the large angle of view image and the small angle of view image, and zoom in/out the size of the small angle of view image according to the proportionality coefficient to obtain the size of the third image.

According to the sixth or the seventh feasible implementation of the second aspect of the embodiments of the present application, in an eighth feasible implementation of the second aspect of the embodiments of the present application, the device further includes an image correction module, and the image correction module is configured to perform image distortion correction on the first image and the second image, where correspondingly the large angle of view image is an image that is in the first image and the second image obtained after image distortion correction and that is corresponding to the larger angle of view, and the small angle of view image is an image that is in the first image and the second image obtained after image distortion correction and that is corresponding to the smaller angle of view.

According to any one of the sixth to the eighth feasible implementations of the second aspect of the embodiments of the present application, in a ninth feasible implementation of the second aspect of the embodiments of the present application, the preset condition includes that the candidate image includes the target photographing object, and a comprehensive score of the candidate image is higher than a preset threshold, where the comprehensive score of the candidate image is positively correlated to a composition score of the candidate image, and is negatively correlated to a degree of impact of an interfering object in the candidate image on the candidate image.

According to the ninth feasible implementation of the second aspect of the embodiments of the present application, in a tenth feasible implementation of the second aspect of the embodiments of the present application, the composition score of the candidate image includes a degree of conformity of a composition manner of the candidate image with at least one of composition rules, a rule of thirds, nine square grid composition, balanced composition, triangle composition, vertical composition, S-type composition, frame composition, diagonal composition, radial composition, open composition, vanishing point composition, face-priority composition, color composition, depth of field composition, or scene composition in a photography composition apparatus.

According to the ninth or the tenth feasible implementation of the second aspect of the embodiments of the present application, in an eleventh feasible implementation of the second aspect of the embodiments of the present application, the degree of the impact of the interfering object in the candidate image on the candidate image includes at least one of an image area covered by the interfering object in the candidate image, a ratio of the image area covered by the interfering object in the candidate image to an image area of the candidate image, a ratio of the image area covered by the interfering object in the candidate image to an image area covered by the target photographing object in the candidate image, a location of the interfering object in the candidate image, a location of the interfering object relative to the target photographing object, or a preset degree of incompatibility between the candidate image and the interfering object.

According to the eleventh feasible implementation of the second aspect of the embodiments of the present application, in a twelfth feasible implementation of the second aspect of the embodiments of the present application, the preset degree of incompatibility between the candidate image and the interfering object includes a color correlation or difference between the interfering object and the candidate image, or a physical attribute correlation or difference between the interfering object and an object in the candidate image.

According to any one of the ninth to the twelfth feasible implementations of the second aspect of the embodiments of the present application, in a thirteenth feasible implementation of the second aspect of the embodiments of the present application, the preset threshold includes a preset fixed value, or a variable value determined based on at least one of resolution of the candidate image or a size of the candidate image, where the variable value is positively correlated to each of the resolution of the candidate image and the size of the candidate image.

According to the thirteenth feasible implementation of the second aspect of the embodiments of the present application, in a fourteenth feasible implementation of the second aspect of the embodiments of the present application, the preset fixed value includes a preset value corresponding to a photographing scene, or a preset value corresponding to a physical attribute of the target photographing object, or a preset value corresponding to an execution time of the photographing preview mode, where the execution time is negatively correlated to the preset value corresponding to the execution time.

According to any one of the sixth to the fourteenth feasible implementations of the second aspect of the embodiments of the present application, in a fifteenth feasible implementation of the second aspect of the embodiments of the present application, the device further includes a fourth determining module, and the fourth determining module is configured to determine the interfering object in the large angle of view image.

According to the fifteenth feasible implementation of the second aspect of the embodiments of the present application, in a sixteenth feasible implementation of the second aspect of the embodiments of the present application, the fourth determining module is further configured to determine the interfering object based on second information entered by the user, or determine the interfering object based on a second preset feature.

According to the sixteenth feasible implementation of the second aspect of the embodiments of the present application, in a seventeenth feasible implementation of the second aspect of the embodiments of the present application, the second information includes a location point in the large angle of view image, or an area in the large angle of view image, or one or more image features that can be identified by the photographing device.

According to the sixteenth or the seventeenth feasible implementation of the second aspect of the embodiments of the present application, in an eighteenth feasible implementation of the second aspect of the embodiments of the present application, the second preset feature includes at least one of preset information about a location of the to-be-determined interfering object in the large angle of view image, preset information about an image area occupied by the to-be-determined interfering object in the large angle of view image, a preset geometric feature of the to-be-determined interfering object, a preset color feature of the to-be-determined interfering object, or preset attribute information of the to-be-determined interfering object.

According to any one of the sixth to the eighteenth feasible implementations of the second aspect of the embodiments of the present application, in a nineteenth feasible implementation of the second aspect of the embodiments of the present application, the third determining module is further configured to select a candidate image with a highest comprehensive score as the third image, or select the third image based on third information entered by the user, or select a candidate image closest to or farthest from a mapping location of the small angle of view image in the large angle of view image as the third image, or select, as the third image, a candidate image that the user has lowest operation difficulty obtaining, where the operation difficulty is determined based on at least one of angles at which the user rotates the photographing device in a horizontal direction or in a vertical direction using a midline of the photographing device as an axis and an angle at which the user rotates the photographing device using a lens optical center direction as an axis.

According to the nineteenth feasible implementation of the second aspect of the embodiments of the present application, in a twentieth feasible implementation of the second aspect of the embodiments of the present application, when at least two candidate images have a same comprehensive score, the third determining module is further configured to select a candidate image with a highest composition score as the third image, or select a candidate image whose interfering object has lowest degree of impact on the candidate image as the third image, or select a candidate image closest to or farthest from the mapping location of the small angle of view image in the large angle of view image as the third image, or select, as the third image, a candidate image that the user has lowest operation difficulty obtaining.

According to any one of the sixth to the twentieth feasible implementations of the second aspect of the embodiments of the present application, in a twenty-first feasible implementation of the second aspect of the embodiments of the present application, the display module is further configured to display the small angle of view image and first prompt information in the photographing preview interface, where the first prompt information is information used to instruct the user to move the photographing range to a photographing range of the third image.

According to the twenty-first feasible implementation of the second aspect of the embodiments of the present application, in a twenty-second feasible implementation of the second aspect of the embodiments of the present application, the image displayed in the photographing preview interface varies with the photographing range in real time.

According to any one of the sixth to the twentieth feasible implementations of the second aspect of the embodiments of the present application, in a twenty-third feasible implementation of the second aspect of the embodiments of the present application, the display module is further configured to display the large angle of view image, the third image, a mapped image of the small angle of view image in the large angle of view image, and second prompt information in the photographing preview interface, where the second prompt information is information used to instruct the user to move the photographing range from the mapped image to a photographing range of the third image.

According to the twenty-third feasible implementation of the second aspect of the embodiments of the present application, in a twenty-fourth feasible implementation of the second aspect of the embodiments of the present application, instruction information of the mapped image displayed in the photographing preview interface varies with the photographing range in real time.

According to the twenty-third or the twenty-fourth feasible implementation of the second aspect of the embodiments of the present application, in a twenty-fifth feasible implementation of the second aspect of the embodiments of the present application, when the photographing range is moved to overlap with the photographing range corresponding to the third image, only the third image is displayed in the photographing preview interface.

According to any one of the second aspect to the twenty-fifth feasible implementation of the second aspect of the embodiments of the present application, in a twenty-sixth feasible implementation of the second aspect of the embodiments of the present application, after the composition prompt of the third image is displayed in the photographing preview interface, the photographing device repeatedly performs photographing preview composition guiding according to preset frequency.

A third aspect of the embodiments of the present application provides a photographing device, used for preview composition guiding and including a memory and a processor, where the processor is configured to perform the following operations obtaining a first image in a photographing preview mode, determining a target photographing object in the first image, obtaining a second image, where the second image includes the target photographing object, the second image and the first image correspond to different angles of view, and the angle of view is used to indicate a photographing range of the photographing device, constructing a third image based on the first image and the second image, where the third image includes the target photographing object, and an angle of view corresponding to the third image is the same as a smaller angle of view in the angles of view corresponding to the first image and the second image, and displaying a composition prompt of the third image in a photographing preview interface.

According to the third aspect of the embodiments of the present application, in a first feasible implementation of the third aspect of the embodiments of the present application, the photographing device has at least two lenses, the first image is obtained by a first lens of the photographing device with a first focal length, where the first lens is located in the first photographing module, and the second image is obtained by a second lens of the photographing device with a second focal length, where the second lens is located in the second photographing module, and the first focal length is different from the second focal length.

According to the third aspect or the first feasible implementation of the third aspect of the embodiments of the present application, in a second feasible implementation of the third aspect of the embodiments of the present application, the photographing device simultaneously obtains the first image and the second image.

According to any one of the third aspect to the second feasible implementation of the third aspect of the embodiments of the present application, in a third feasible implementation of the third aspect of the embodiments of the present application, the processor is further configured to determine the target photographing object based on first information entered by a user, or determine the target photographing object based on a first preset feature.

According to the third feasible implementation of the third aspect of the embodiments of the present application, in a fourth feasible implementation of the third aspect of the embodiments of the present application, the first information includes a location point in the first image, or an area in the first image, or one or more image features that can be identified by the photographing device.

According to the third or the fourth feasible implementation of the third aspect of the embodiments of the present application, in a fifth feasible implementation of the third aspect of the embodiments of the present application, the first preset feature includes at least one of preset information about a location of the to-be-determined target photographing object in the first image, preset information about an image area occupied by the to-be-determined target photographing object in the first image, a preset geometric feature of the to-be-determined target photographing object, a preset color feature of the to-be-determined target photographing object, or preset attribute information of the to-be-determined target photographing object.

According to any one of the third aspect to the fifth feasible implementation of the third aspect of the embodiments of the present application, in a sixth feasible implementation of the third aspect of the embodiments of the present application, a large angle of view image is an image that is in the first image and the second image and that is corresponding to a larger angle of view, a small angle of view image is an image that is in the first image and the second image and that is corresponding to the smaller angle of view, and the processor is further configured to determine a shape and a size of the third image based on the large angle of view image and the small angle of view image, search, using the shape and the size of the third image as a shape and a size of a search window, the large angle of view image for at least one candidate image that meets a preset condition, and determine the candidate image as the third image when there is one candidate image, and select one candidate image as the third image when there are more than one candidate image.

According to the sixth feasible implementation of the third aspect of the embodiments of the present application, in a seventh feasible implementation of the third aspect of the embodiments of the present application, the processor is further configured to determine that the shape of the third image is the same as a shape of the small angle of view image obtained after image distortion correction, determine a proportionality coefficient of a size of the small angle of view image relative to a size of the large angle of view image based on a proportional relationship between the first focal length and the second focal length and based on the angles of view respectively corresponding to the large angle of view image and the small angle of view image, and zoom in/out the size of the small angle of view image according to the proportionality coefficient to obtain the size of the third image.

According to the sixth or the seventh feasible implementation of the third aspect of the embodiments of the present application, in an eighth feasible implementation of the third aspect of the embodiments of the present application, the processor is further configured to perform image distortion correction on the first image and the second image, where correspondingly the large angle of view image is an image that is in the first image and the second image obtained after image distortion correction and that is corresponding to the larger angle of view, and the small angle of view image is an image that is in the first image and the second image obtained after image distortion correction and that is corresponding to the smaller angle of view.

According to any one of the sixth to the eighth feasible implementations of the third aspect of the embodiments of the present application, in a ninth feasible implementation of the third aspect of the embodiments of the present application, the preset condition includes that the candidate image includes the target photographing object, and a comprehensive score of the candidate image is higher than a preset threshold, where the comprehensive score of the candidate image is positively correlated to a composition score of the candidate image, and is negatively correlated to a degree of impact of an interfering object in the candidate image on the candidate image.

According to the ninth feasible implementation of the third aspect of the embodiments of the present application, in a tenth feasible implementation of the third aspect of the embodiments of the present application, the composition score of the candidate image includes a degree of conformity of a composition manner of the candidate image with at least one of composition rules, a rule of thirds, nine square grid composition, balanced composition, triangle composition, vertical composition, S-type composition, frame composition, diagonal composition, radial composition, open composition, vanishing point composition, face-priority composition, color composition, depth of field composition, or scene composition in a photography composition apparatus.

According to the ninth or the tenth feasible implementation of the third aspect of the embodiments of the present application, in an eleventh feasible implementation of the third aspect of the embodiments of the present application, the degree of the impact of the interfering object in the candidate image on the candidate image includes at least one of an image area covered by the interfering object in the candidate image, a ratio of the image area covered by the interfering object in the candidate image to an image area of the candidate image, a ratio of the image area covered by the interfering object in the candidate image to an image area covered by the target photographing object in the candidate image, a location of the interfering object in the candidate image, a location of the interfering object relative to the target photographing object, or a preset degree of incompatibility between the candidate image and the interfering object.

According to the eleventh feasible implementation of the third aspect of the embodiments of the present application, in a twelfth feasible implementation of the third aspect of the embodiments of the present application, the preset degree of incompatibility between the candidate image and the interfering object includes a color correlation or difference between the interfering object and the candidate image, or a physical attribute correlation or difference between the interfering object and an object in the candidate image.

According to any one of the ninth to the twelfth feasible implementations of the third aspect of the embodiments of the present application, in a thirteenth feasible implementation of the third aspect of the embodiments of the present application, the preset threshold includes a preset fixed value, or a variable value determined based on at least one of resolution of the candidate image or a size of the candidate image, where the variable value is positively correlated to each of the resolution of the candidate image and the size of the candidate image.

According to the thirteenth feasible implementation of the third aspect of the embodiments of the present application, in a fourteenth feasible implementation of the third aspect of the embodiments of the present application, the preset fixed value includes a preset value corresponding to a photographing scene, or a preset value corresponding to a physical attribute of the target photographing object, or a preset value corresponding to an execution time of the photographing preview mode, where the execution time is negatively correlated to the preset value corresponding to the execution time.

According to any one of the sixth to the fourteenth feasible implementations of the third aspect of the embodiments of the present application, in a fifteenth feasible implementation of the third aspect of the embodiments of the present application, the processor is further configured to determine the interfering object in the large angle of view image.

According to the fifteenth feasible implementation of the third aspect of the embodiments of the present application, in a sixteenth feasible implementation of the third aspect of the embodiments of the present application, the processor is further configured to determine the interfering object based on second information entered by the user, or determine the interfering object based on a second preset feature.

According to the sixteenth feasible implementation of the third aspect of the embodiments of the present application, in a seventeenth feasible implementation of the third aspect of the embodiments of the present application, the second information includes a location point in the large angle of view image, or an area in the large angle of view image, or one or more image features that can be identified by the photographing device.

According to the sixteenth or the seventeenth feasible implementation of the third aspect of the embodiments of the present application, in an eighteenth feasible implementation of the third aspect of the embodiments of the present application, the second preset feature includes at least one of preset information about a location of the to-be-determined interfering object in the large angle of view image, preset information about an image area occupied by the to-be-determined interfering object in the large angle of view image, a preset geometric feature of the to-be-determined interfering object, a preset color feature of the to-be-determined interfering object, or preset attribute information of the to-be-determined interfering object.

According to any one of the sixth to the eighteenth feasible implementations of the third aspect of the embodiments of the present application, in a nineteenth feasible implementation of the third aspect of the embodiments of the present application, the processor is further configured to select a candidate image with a highest comprehensive score as the third image, or select the third image based on third information entered by the user, or select a candidate image closest to or farthest from a mapping location of the small angle of view image in the large angle of view image as the third image, or select, as the third image, a candidate image that the user has lowest operation difficulty obtaining, where the operation difficulty is determined based on at least one of angles at which the user rotates the photographing device in a horizontal direction or in a vertical direction using a midline of the photographing device as an axis and an angle at which the user rotates the photographing device using a lens optical center direction as an axis.

According to the nineteenth feasible implementation of the third aspect of the embodiments of the present application, in a twentieth feasible implementation of the third aspect of the embodiments of the present application, when at least two candidate images have a same comprehensive score, the processor is further configured to select a candidate image with a highest composition score as the third image, or select a candidate image whose interfering object has lowest degree of impact on the candidate image as the third image, or select a candidate image closest to or farthest from the mapping location of the small angle of view image in the large angle of view image as the third image, or select, as the third image, a candidate image that the user has lowest operation difficulty obtaining.

According to any one of the sixth to the twentieth feasible implementations of the third aspect of the embodiments of the present application, in a twenty-first feasible implementation of the third aspect of the embodiments of the present application, the processor is further configured to display the small angle of view image and first prompt information in the photographing preview interface, where the first prompt information is information used to instruct the user to move the photographing range to a photographing range of the third image.

According to the twenty-first feasible implementation of the third aspect of the embodiments of the present application, in a twenty-second feasible implementation of the third aspect of the embodiments of the present application, the image displayed in the photographing preview interface varies with the photographing range in real time.

According to any one of the sixth to the twentieth feasible implementations of the third aspect of the embodiments of the present application, in a twenty-third feasible implementation of the third aspect of the embodiments of the present application, the processor is further configured to display the large angle of view image, the third image, a mapped image of the small angle of view image in the large angle of view image, and second prompt information in the photographing preview interface, where the second prompt information is information used to instruct the user to move the photographing range from the mapped image to a photographing range of the third image.

According to the twenty-third feasible implementation of the third aspect of the embodiments of the present application, in a twenty-fourth feasible implementation of the third aspect of the embodiments of the present application, instruction information of the mapped image displayed in the photographing preview interface varies with the photographing range in real time.

According to the twenty-third or the twenty-fourth feasible implementation of the third aspect of the embodiments of the present application, in a twenty-fifth feasible implementation of the third aspect of the embodiments of the present application, when the photographing range is moved to overlap with the photographing range corresponding to the third image, only the third image is displayed in the photographing preview interface.

According to any one of the third aspect to the twenty-fifth feasible implementation of the third aspect of the embodiments of the present application, in a twenty-sixth feasible implementation of the third aspect of the embodiments of the present application, after the composition prompt of the third image is displayed in the photographing preview interface, the photographing device repeatedly performs photographing preview composition guiding according to preset frequency.

A fourth aspect of the embodiments of the present application provides a computer storage medium configured to store a computer software instruction used to implement the method according to the first aspect, where the instruction includes a program designed for executing the first aspect.

It should be understood that the second to the fourth aspects of the embodiments of the present application have consistent technical solutions with and similar beneficial effects as the first aspect of the embodiments of the present application. Details are not described again.

It can be learned from the foregoing technical solutions that, in the embodiments of the present application, image information of different angles of view is obtained, and image information around a current photographing range is introduced for reference in order to more properly select a photographing range and a composition manner, avoid causing a new framing problem after the photographing range is adjusted, and avoid a plurality of adjustments made by a user to avoid a framing problem. A scoring system is used and an impact factor of an interfering object is introduced to automatically provide a direct preferred composition manner for the user to perform composition such that user experience is improved. A plurality of methods for determining a photographing range are provided for the user from different perspectives, and a personalized requirement of the user is fully considered when auxiliary composition is provided for the user. A direct and easy-to-understand composition guide is provided for the user, and a real-time dynamic guide is provided for the user in a process in which the user adjusts the photographing range such that operation convenience of the user is improved.

BRIEF DESCRIPTION OF DRAWINGS

To describe the technical solutions in some of the embodiments of the present application more clearly, the following briefly describes the accompanying drawings describing some of the embodiments. The accompanying drawings in the following description show merely some embodiments of the present application, and persons of ordinary skill in the art may still derive other drawings from these accompanying drawings without creative efforts.

DESCRIPTION OF EMBODIMENTS

Figure 1:
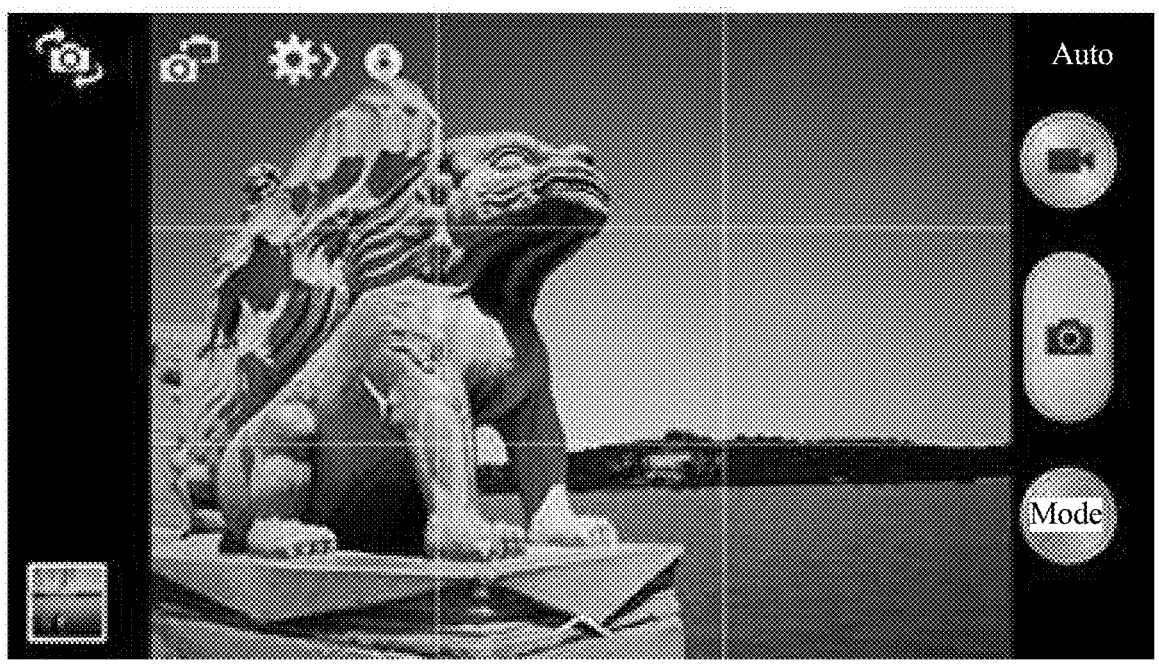
FIG. 1 is an application scenario of example auxiliary photography composition according to an embodiment of the present application.

To make the objectives, technical solutions, and advantages of the present application clearer, the following further describes the present application in detail with reference to the accompanying drawings. The described embodiments are merely some rather than all of the embodiments of the present application. All other embodiments obtained by persons of ordinary skill in the art based on the embodiments of the present application without creative efforts shall fall within the protection scope of the present application.

In the specification, claims, and accompanying drawings of the present application, the terms "first", "second", and the like are intended to distinguish between different objects but do not indicate a particular order. Moreover, the terms "including", "comprising", and any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, or the device.

Embodiments of the present application provide a photography composition guiding method and an apparatus to obtain image information of different angles of view, and introduce image information around a current photographing range for reference in order to more properly select a photographing range and a composition manner, avoid causing a new framing problem after the photographing range is adjusted, and avoid a plurality of adjustments made by a user to avoid a framing problem. A scoring system is used and an impact factor of an interfering object is introduced to automatically provide a direct preferred composition manner for the user to perform composition such that user experience is improved. A plurality of methods for determining a photographing range are provided for the user from different perspectives, and a personalized requirement of the user is fully considered when auxiliary composition is provided for the user. A direct and easy-to-understand composition guide is provided for the user, and a real-time dynamic guide is provided for the user in a process in which the user adjusts the photographing range such that operation convenience of the user is improved.

For a same scene, an effect of a photographed photo mainly depends on framing and photosensitive parameters (including parameters such as an aperture, a shutter, International Organization for Standardization (ISO), and a color temperature). Content expressed in a photo depends more on a photographer's framing. A digital photographing device currently supports intelligent settings of various photosensitive parameters, and the photosensitive parameters may be automatically adjusted during photographing. However, generally, an angle of view in framing cannot be automatically adjusted, and a photographer needs to determine the angle of view in framing when performing photographing. Most users of photographing devices have no corresponding composition knowledge. During photographing, if a system can instruct, using a feedback, a user to obtain good framing in a way such as adjusting an angle of photographing, photographing experience and a sense of achievement of the user may be greatly improved, and the value of the product is finally improved.

However, in some existing photography composition systems that automatically provide feedbacks, because only composition of a current preview image is considered, a new framing problem is caused after a photographing range is adjusted, for example, an interfering object outside a framing range before the adjustment is introduced. As a result, the user frequently makes adjustments to avoid the framing problem.

FIG. 1 shows an example of an application scenario according to an embodiment of the present application. As an auxiliary means of photography composition, some photographing devices such as a smartphone that has a photographing function in FIG. 1 may enable an auxiliary composition function in a preview photographing mode, and a commonly used composition means such as "nine square grids" is used to instruct a user to adjust a composition manner. In a photography composition method, commonly used auxiliary composition means further include a rule of thirds, balanced composition, triangle composition, vertical composition, S-type composition, frame composition, diagonal composition, radial composition, open composition, vanishing point composition, face-priority composition, and the like. "Eight Methods for Photography Composition" (Youth Journalist, No. 14, 2007) describes the several auxiliary means in detail, and all content of the document is incorporated herein by reference. It should be understood that commonly used auxiliary composition means in this embodiment of the present application include but are not limited to the foregoing methods. It should be also understood that the photographing device in this embodiment of the present application further includes a tablet computer, a digital camera, and the like that have a photographing function. This is not limited.

Figure 2:
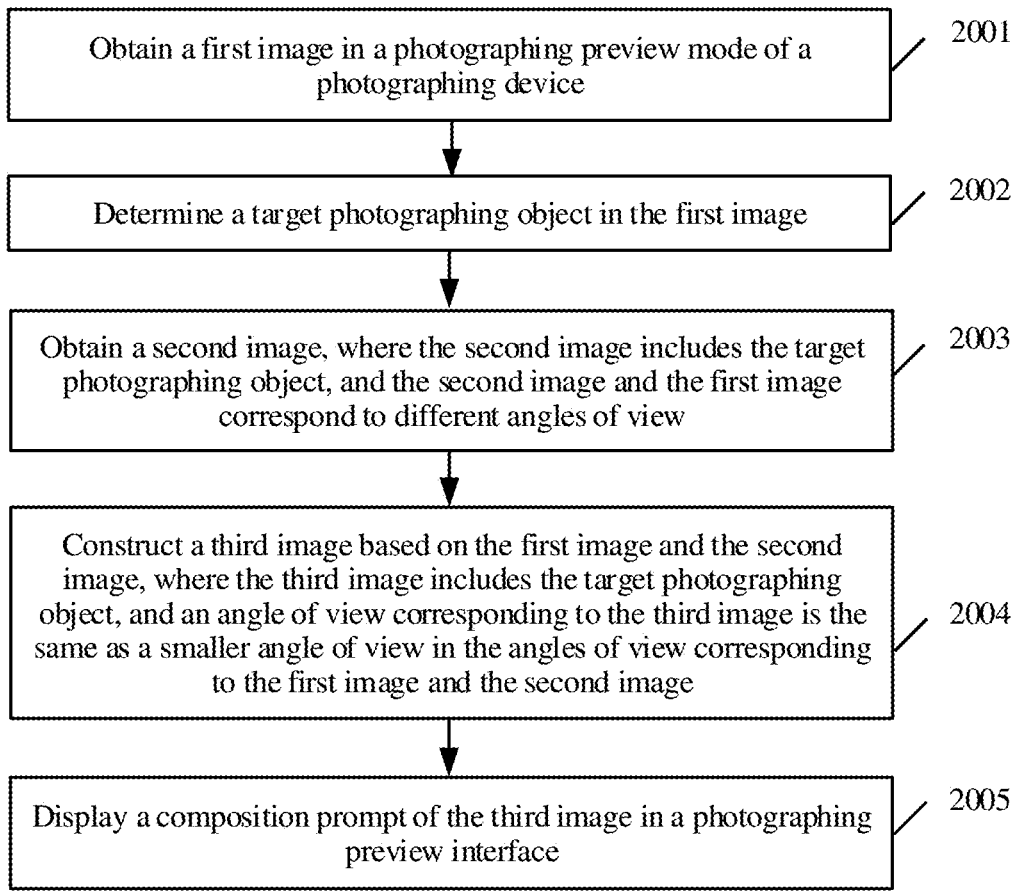
FIG. 2 is a schematic flowchart of an example photography composition guiding method according to an embodiment of the present application.

FIG. 2 shows an example of a schematic flowchart of a photography composition guiding method according to an embodiment of the present application. The composition guiding method shown in FIG. 2 may include the following steps.

Step 2001. Obtain a first image in a photographing preview mode of a photographing device.

In this embodiment of the present application, the photographing preview mode is a preparation phase of photographing. After a photographing function of the photographing device is enabled, the photographing device may automatically enter the photographing preview mode, or enter the mode after an option in a function menu is selected. A user may adjust a photographing parameter and a composition manner in the photographing preview mode by observing a to-be-photographed scene that is fed back in real time in a framing window to obtain a satisfied photographing effect and perform photographing.

In this embodiment of the present application, the first image is an image captured by a camera of the photographing device in the photographing preview mode. For a specific image obtaining manner, refer to various feasible implementations of taking a photo by a photographing device in the other approaches. Details are not described.

Step 2002. Determine a target photographing object in the first image.

In this embodiment of the present application, the target photographing object is a subject that the user wants to show, for example, a main character at the time of taking a photo of humans, and a foreground object at the time of taking a scenery photo.

In a feasible implementation, the photographing device determines the target photographing object based on first information entered by the user. For example, the first information enter by the user may be a location point in the first image, may be an area in the first image, or maybe one or more image features that can be identified by the photographing device.

In a specific embodiment, the first image or the first image obtained after being zoomed in/out and cropped is displayed on a screen of a photographing preview interface. The user may move an indicator on the screen to the target photographing object by tapping a point on the target photographing object on the screen (touchscreen) or using up, down, left, and right arrow keys or in another input method to determine the target photographing object. In some embodiments, the photographing device may further identify an image area covered by the target photographing object in the first image based on the input point and technologies such as image segmentation. "Survey of Image Segmentation Methods" (Pattern Recognition and Artificial Intelligence, No. 03, 1999) describes several typical image segmentation methods in the other approaches, and all content of the document is incorporated herein by reference. It should be understood that commonly used image segmentation technical means in this embodiment of the present application include but are not limited to the foregoing methods.

In a specific embodiment, the first image or the first image obtained after being zoomed in/out and cropped is displayed on a screen of a photographing preview interface. The user may circle the target photographing object on the screen by circling the target photographing object on the screen (touchscreen) or using up, down, left, and right arrow keys or in another input manner. In some embodiments, the photographing device may further determine an image area covered by the target photographing object in the first image based on a circled image range.

In a specific embodiment, the first image or the first image obtained after being zoomed in/out and cropped is displayed on a screen of a photographing preview interface. The user may select a feature such as face, red, flower, circle, or foreground or a combination of a plurality of features from a preset feature list menu, for example, a red flower or a face with glasses. The photographing device performs matching in the obtained first image based on one or more features selected by the user to obtain the target photographing object. In some embodiments, the photographing device may further determine an image area covered by the target photographing object in the first image. It should be understood that in some embodiments, the preset feature list menu includes image features that can be identified by the photographing device. Feature data corresponding to a preset feature is generally obtained using a training method, and the feature data obtained through training is stored in a memory of the photographing device. After obtaining a feature entered by the user, the photographing device obtains feature data corresponding to the feature, and searches the first image for matched data based on the obtained feature data to obtain a target photographing object corresponding to the feature entered by the user. Documents such as "Human Face Recognition: A Survey" (Journal of Image and Graphics, No. 11, 2000) and "Research and Development on Deep Learning" (Application Research of Computers, No. 07, 2014) describe some methods for training feature data and performing image feature recognition in the other approaches, and all content of the documents is incorporated herein by reference. It should be understood that a feature data training method and a feature recognition and matching method in this embodiment of the present application include but are not limited to the foregoing methods. In some embodiments, when more than one matching result is obtained based on a plurality of features selected by the user, the photographing device may select one of the matching results and recommend the matching result to the user, or display all the matching results to the user and wait for selection information of the user, to determine the target photographing object.

A beneficial effect of the foregoing embodiment of the present application is as follows. The target photographing object is determined by interacting with the user such that accuracy of determining the target photographing object is improved.

In a feasible implementation, the photographing device determines the target photographing object based on a first preset feature. The first preset feature includes at least one of preset information about a location of the to-be-determined target photographing object in the first image, preset information about an image area occupied by the to-be-determined target photographing object in the first image, a preset geometric feature of the to-be-determined target photographing object, a preset color feature of the to-be-determined target photographing object, or preset attribute information of the to-be-determined target photographing object.

In a specific embodiment, the first preset feature may be a location feature, for example, a photographing object at a middle location of the image, or a photographing object at a left one-third location of the image. The photographing device uses a photographing object at the preset location as the target photographing object.

In a specific embodiment, the first preset feature may be an absolute value of an area occupied the target photographing object in the first image or a proportion of the area occupied the target photographing object to an area of the first image. For example, the photographing device may use, as the target photographing object, an object that occupies an image area greater than a quarter of the area of the first image, use, as the target photographing object, an object that occupies an image area greater than one-fifth of the area of the first image and less than one-third of the area of the first image, or use, as the target photographing object, an object that occupies an image area greater than ten square centimeters.

In a specific embodiment, the first preset feature may be a geometric feature of the photographing object, for example, a circle or a square, or a color feature of the photographing object, for example, red or green, or may be attribute information of the photographing object, for example, a face or a foreground object. The photographing device may use, as the target photographing object using the feature recognition and matching method, a photographing object that meets one or more preset features. It should be understood that specific implementation means and reference documents of feature recognition and matching are described in the foregoing embodiments. Details are not described again.

It should be understood that, when the first preset feature includes a plurality of independent features, according to a selection of the user or system settings of the photographing device, a matching result may be a matching result that separately meets the plurality of independent features, for example, a face at a middle location, or may be a matching result similar to a weighted result of the plurality of independent features, for example, when the preset feature is a face at a middle location, the matching result may be a photographing object at the middle location when it is specified that a weighted value of a location feature is relatively large, and the matching result may be a face at a middle right location when it is specified that a weighted value of an attribute feature is relatively large.

A beneficial effect of the foregoing embodiment of the present application is as follows. The target photographing object is determined through automatic feature recognition of the photographing device such that user convenience is improved.

It should be understood that there may be one or more target photographing objects in this embodiment of the present application. This is not limited.

Step 2003. Obtain a second image, where the second image includes the target photographing object, and the second image and the first image correspond to different angles of view.

Generally, a lens is used as a vertex, and an included angle formed by two edges of a maximum range that is of an object image of a measured object and that passes through the lens is referred to as an angle of view. During photographing, the angle of view determines a field of view of obtaining an image by the photographing device, and a larger angle of view indicates a larger field of view. In this embodiment of the present application, the angle of view is used to indicate a photographing range of the photographing device.

In this embodiment of the present application, the second image is an image captured by the camera of the photographing device in the photographing preview mode. For a specific image obtaining manner, refer to various feasible implementations of taking a photo by a photographing device in the other approaches. Details are not described. The second image and the first image have different angles of view, and the second image needs to include the target photographing object when the second image is obtained.

In a feasible implementation, images of different angles of view, to be specific, the first image and the second image, may be obtained by adjusting a focal length of the lens of the photographing device.

Figure 3:
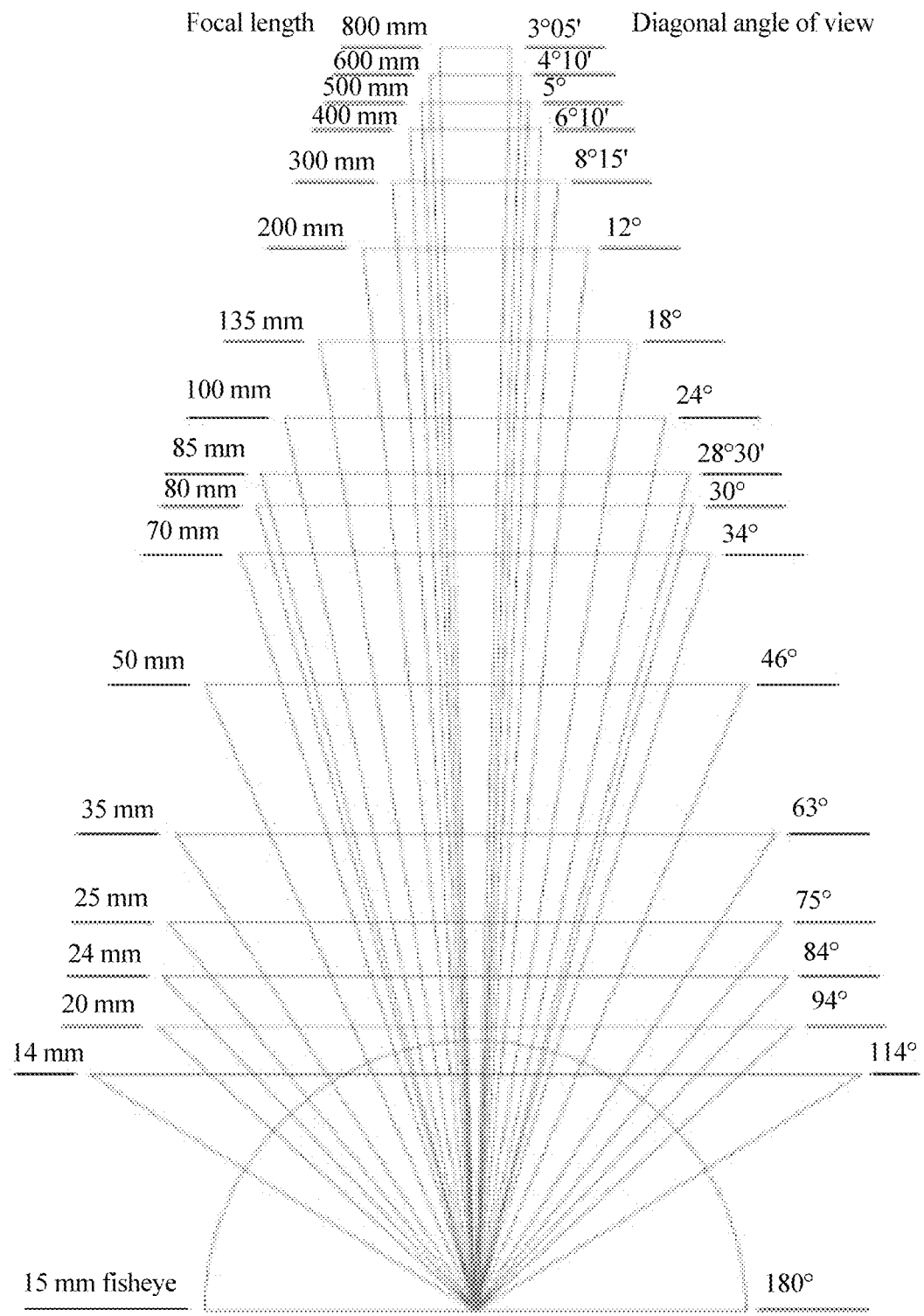
FIG. 3 is a schematic diagram of an example correspondence between a focal length and an angle of view according to an embodiment of the present application.
Figure 4:
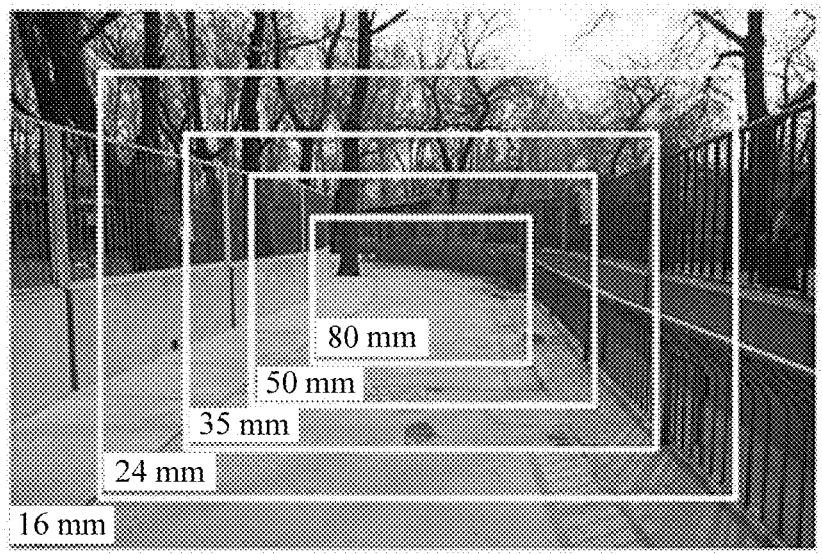
FIG. 4 is a schematic diagram of an example correspondence between a focal length and a field of view according to an embodiment of the present application.

It should be understood that, when a same image height is used, a larger focal length indicates a smaller angle of view, and indicates a limited field of view during photographing. For example, FIG. 3 and FIG. 4 respectively show a typical correspondence between a focal length and an angle of view and a typical correspondence between a focal length and a field of view.

In a feasible implementation, the photographing device includes two independent lenses. A first lens may obtain the first image with a first focal length, and a second lens may obtain the second image with a second focal length. The first focal length is different from the second focal length.

It should be understood that because the first lens and the second lens are mutually independent, the first image and the second image may be simultaneously obtained by the photographing device in some embodiments.

A beneficial effect of the foregoing embodiment of the present application is as follows. Image information of different angles of view is simultaneously obtained such that real-time quality of image processing is improved, image content inconsistency caused by inconsistent obtaining times is reduced, and accuracy of image selection is improved.

Step 2004. Construct a third image based on the first image and the second image, where the third image includes the target photographing object, and an angle of view corresponding to the third image is the same as a smaller angle of view in the angles of view corresponding to the first image and the second image.

It should be understood that, because the second image and the first image have different angles of view, regardless of an image of which angle of view is obtained in step 2001 or step 2003, an image that is in the first image and second image and that is corresponding to the larger angle of view may be collectively referred to as a large angle of view image, and the other image corresponding to the smaller angle of view may be collectively referred to as a small angle of view image. Therefore, in step 2004, the third image is constructed based on the large angle of view image and the small angle of view image. In this embodiment of the present application, the third image is an image corresponding to a framing range recommended by the photographing device to the user. In a feasible implementation, the angle of view of the third image is the same as the angle of view of the small angle of view image.

Figure 5:
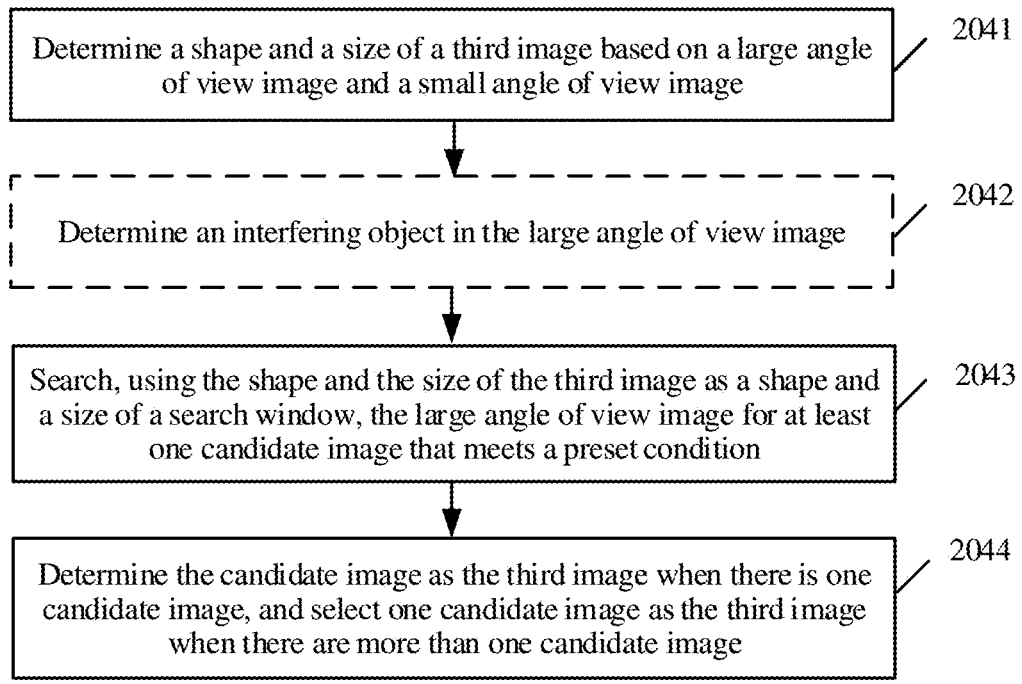
FIG. 5 is a schematic flowchart of another example photography composition guiding method according to an embodiment of the present application.

In a feasible implementation, as shown in FIG. 5, step 2004 further includes the following steps.

Step 2041. Determine a shape and a size of the third image based on a large angle of view image and a small angle of view image.

For example, the shape of the third image may be a rectangle with a length-width ratio of 4:3, where a length is 16 centimeters (cm), and a width is 12 cm. The shape of the third image may be an ellipse, where a focal length is 6 cm, a minor axis is 8 cm, and a major axis is 10 cm. The shape of the third image may be a regular shape, or may be an irregular shape. The third image may be in any size. This is not limited.

Figure 6:
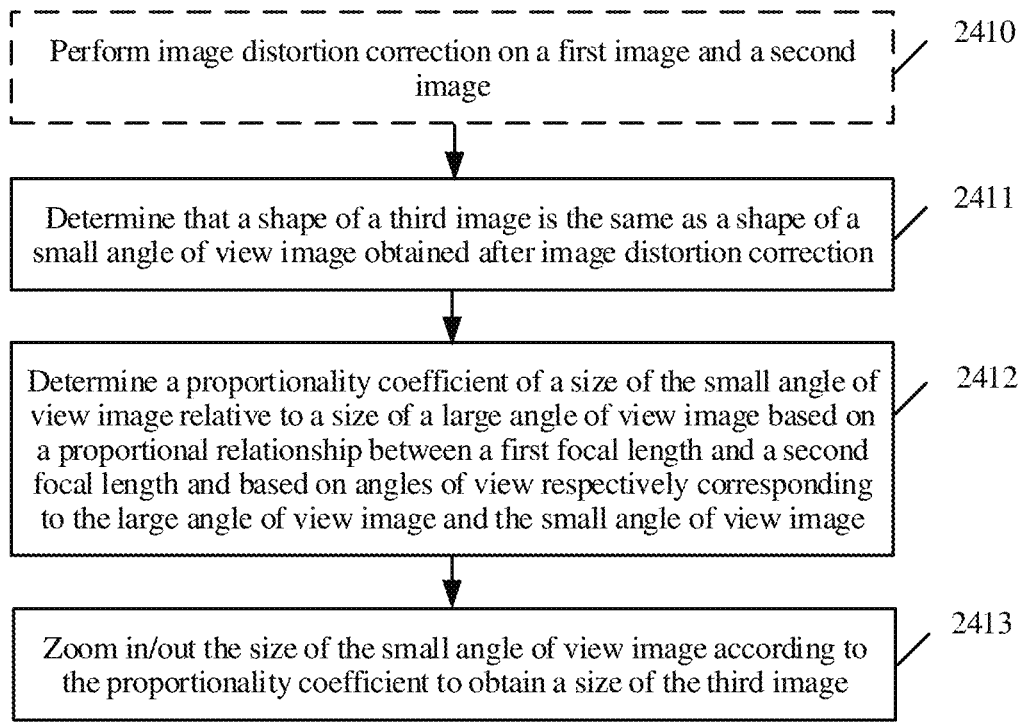
FIG. 6 is a schematic flowchart of still another example photography composition guiding method according to an embodiment of the present application.

In a feasible implementation, as shown in FIG. 6, step 2041 further includes the following steps.

Step 2411. Determine that the shape of the third image is the same as a shape of the small angle of view image obtained after image distortion correction.

Further, the shape of the small angle of view image obtained after image distortion correction is used as the shape of the third image. The shape of the small angle of view image depends on a photographing parameter of a lens during image photographing, and the shape of the small angle of view image may be further obtained by performing post-processing on a photographed image. For example, image processing may be performed on the photographed image to obtain an image in a specific shape after image cropping is performed.

It should be understood that, because a photosensitive chip configured for a mobile phone camera is generally arranged in a rectangular array, photographed images are also rectangular. When there is no optical distortion, any rectangular subimage with resolution of N×M, namely, the third image in this embodiment, is captured from the large angle of view image, and captured rectangular subimages correspond to a same real angle of view. However, rectangular subimages with resolution of N×M at different locations in the large angle of view image represent different real angles of view due to effect of optical distortion of a lens. Therefore, in the large angle of view image, if images of a same angle of view are obtained at different locations, shapes and sizes of the images at different locations are different. However, if the third image is searched for after image distortion correction is performed on the large angle of view image and the small angle of view image, third images at different locations in the large angle of view image has a same shape and size.

Image distortion correction is described in the following embodiment. Details are not described.

Step 2412. Determine a proportionality coefficient of a size of the small angle of view image relative to a size of the large angle of view image based on a proportional relationship between a first focal length and a second focal length and based on angles of view respectively corresponding to the large angle of view image and the small angle of view image.

When image distortion is relatively small, a relationship among a focal length, an angle of view, and an image height may be described as:

$$\theta = \tan^{-1}(h/2f),$$

where $\theta$ is a half of the angle of view, h is the image height, and f is the focal length. For example, the proportionality coefficient of the size of the small angle of view image relative to the size of the large angle of view image may be approximately equal to a value obtained based on the foregoing formula. Further, assuming that the angle of view of the small angle of view image is $\theta s$, the angle of view of the large angle of view image is $\theta l$, and a proportional relationship between a focal length of the small angle of view image and a focal length of the large angle of view image is N, the proportionality coefficient $\rho$ of the size of the small angle of view image relative to the size of the large angle of view image may be represented as $$\frac{N * \tan \theta s}{\tan \theta l}.$$

Step 2413. Zoom in/out the size of the small angle of view image according to the proportionality coefficient to obtain the size of the third image.

Further, according to the embodiment in step 2412, for example, the size of the third image may be obtained based on a formula $$\frac{hs}{\rho},$$

where hs is the size of the small angle of view image.

In a feasible implementation, when the shape of the third image is being determined, correction may not be first performed on the large angle of view image and the small angle of view image, but in a search process, correction and reverse correction are performed on the small angle of view image obtained after the zooming in/out to obtain third images in different shapes and sizes at different locations in the large angle of view image.

In a feasible implementation, before step 2411, step 2041 further includes the following step.

Step 2410. Perform image distortion correction on the first image and the second image.

Figure 7:
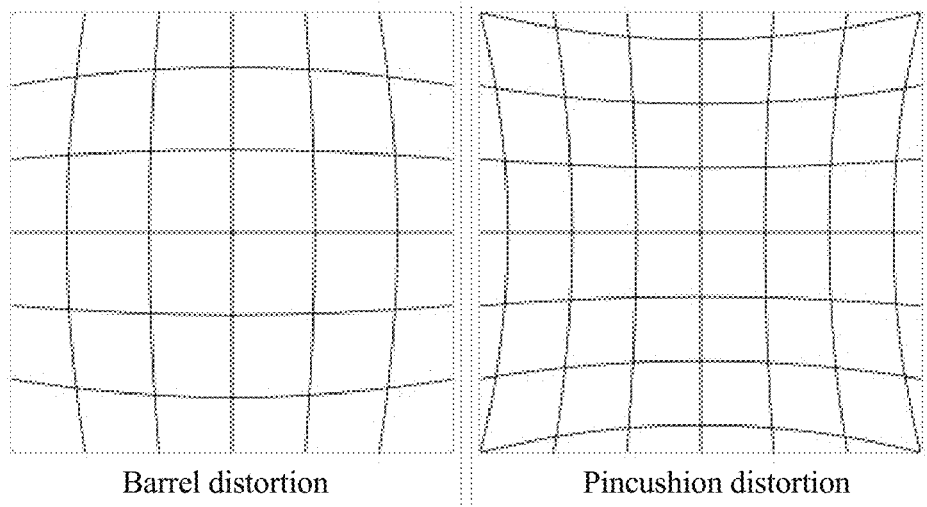
FIG. 7 is a schematic diagram of example lens imaging distortion according to an embodiment of the present application.

Due to a processing error and an assembly error, there is a difference between a camera optical system and an ideal pinhole imaging model. Therefore, different degrees of nonlinear optical distortion exist between an actual image of an object point on a camera image plane and an ideal image of the object point. Different lenses have different imaging distortion features. As shown in FIG. 7, generally, a wide-angle lens easily generates barrel distortion, and a long-focus lens easily generates pincushion distortion. There is also a distortion difference between different imaging areas of a same lens. In an embodiment, if optical imaging distortion of a camera is relatively severe, imaging distortion of a camera lens may need to be considered. "Overview of Nonlinear Distortion Correction of Camera Lens" (Journal of Image and Graphics, No. 03, 2005) describes some image distortion correction methods in the other approaches, and all content of the document is incorporated herein by reference. It should be understood that image distortion correction performed on the first image and the second image in this embodiment of the present application includes but is not limited to the foregoing method.

It should be understood that when step 2410 exists in a specific implementation, in subsequent steps, the large angle of view image is an image that is in the first image and the second image obtained after image distortion correction and that is corresponding to the larger angle of view, and the small angle of view image is an image that is in the first image and the second image obtained after image distortion correction and that is corresponding to the smaller angle of view.

A beneficial effect of the foregoing embodiment of the present application is as follows. Image distortion correction is performed before an image is processed such that shapes and sizes of search windows corresponding to different locations in the large angle of view image are unified, image processing efficiency and accuracy are improved, and a more accurate image composition score can be obtained compared with a case in which image distortion correction is not performed.

Step 2043. Search, using the shape and the size of the third image as a shape and a size of a search window, the large angle of view image for at least one candidate image that meets a preset condition.

Further, the large angle of view image is used as a to-be-searched image, the shape and the size of the third image that are determined in the foregoing step are used as the shape and the size of the search window, and the to-be-searched image is searched for one or more candidate images that meet the preset condition. For example, the search window obtained after the size corresponding to the third image is zoomed out in proportion by adjusting a focal length is slid and rotated on the large angle of view image, and when an image covered by the slid and rotated search window meets the preset condition, the candidate image is obtained.

The preset condition includes that the candidate image includes the target photographing object, and a comprehensive score of the candidate image is higher than a preset threshold. The comprehensive score of the candidate image is positively correlated to a composition score of the candidate image, and is negatively correlated to a degree of impact of an interfering object in the candidate image on the candidate image.

In a feasible implementation, the composition score of the candidate image includes a degree of conformity of a composition manner of the candidate image with at least one of composition rules, a rule of thirds, nine square grid composition, balanced composition, triangle composition, vertical composition, S-type composition, frame composition, diagonal composition, radial composition, open composition, vanishing point composition, face-priority composition, color composition, depth of field composition, or scene composition in a photography composition method.

It should be understood that the composition score may be a score obtained based on a degree of conformity of composition with a single rule, or may be a score obtained based on a degree of comprehensive conformity of composition with a plurality of rules, or may be a final score obtained after weighting is performed on scores obtained in various single rules. This is not limited. A higher composition score of the candidate image indicates a higher comprehensive score. "Optimizing photo composition" (Computer Graphics Forum, 2010, 29 (2): 469-478) describes some methods for scoring photography composition in the other approaches, and all content of the document is incorporated herein by reference. It should be understood that the method for scoring composition in this embodiment of the present application includes but is not limited to the foregoing method.

In a feasible implementation, the score may be automatically generated by the photographing device.

A beneficial effect of the foregoing embodiment of the present application is as follows. A scoring system is used to automatically provide a direct preferred composition manner for a user to perform composition such that user experience is improved.

In a feasible implementation, the degree of the impact of the interfering object in the candidate image on the candidate image includes at least one of an image area covered by the interfering object in the candidate image, a ratio of the image area covered by the interfering object in the candidate image to an image area of the candidate image, a ratio of the image area covered by the interfering object in the candidate image to an image area covered by the target photographing object in the candidate image, a location of the interfering object in the candidate image, a location of the interfering object relative to the target photographing object, or a preset degree of incompatibility between the candidate image and the interfering object. The preset degree of incompatibility between the candidate image and the interfering object may include a color correlation or difference between the interfering object and the candidate image, or a physical attribute correlation or difference between the interfering object and an object in the candidate image. For example, the color correlation between the interfering object and the candidate image indicates that a similar color of the interfering object and content in the candidate image affects visual attention. The color difference between the interfering object and the candidate image indicates that a great color difference between the interfering object and content in the candidate image causes visual contrast. The physical attribute correlation between the interfering object and the object in the candidate image indicates that the interfering object and the object in the candidate image belong to a same type of physical unit (a human, an animal, or a still object). This affects a main photographing object. The physical attribute difference between the interfering object and the object in the candidate image indicates that the interfering object and the object in the candidate image belong to physical units with a great difference (landscape and tourist). This causes visual clutter.

Further, it is assumed that the degree of the impact of the interfering object in the candidate image on the candidate image is an impact coefficient, and a value of the impact coefficient is from 0 to 1, namely, [0, 1]. For example, when the area covered by the interfering object is 5 square centimeters ($cm^2$), the impact coefficient is 0.2. When the area covered by the interfering object is 10 $cm^2$, the impact coefficient is 0.5. For example, when the area covered by the interfering object accounts for 10% of the area of the candidate image, the impact coefficient is 0.1. When the area covered by the interfering object accounts for 50% of the area of the candidate image, the impact coefficient is 0.9. For example, when the ratio of the area covered by the interfering object to the area covered by the target photographing object is 0.3 in the candidate image, the impact coefficient is 0.2. When the ratio of the area covered by the interfering object to the area covered by the target photographing object is 2 in the candidate image, the impact coefficient is 1. For example, when the interfering object is located at the middle of the candidate image, the impact coefficient is 1. When the interfering object is located at the edge of the candidate image, the impact coefficient is 0.05. For example, when a distance between the interfering object and the target photographing object is greater than one-half of a candidate image width, the impact coefficient is 0.5. When the distance between the interfering object and the target photographing object is less than one-fifth of the candidate image width, the impact coefficient is 0.8. For example, when the interfering object is red and a dominant hue of the candidate image is green, the impact coefficient is 0.85. When the interfering object is dark green and the dominant hue of the candidate image is green, the impact coefficient is 0.4. For example, when the interfering object is red and the target photographing object is also red, the impact coefficient is 0.7. When the interfering object is gray and the target photographing object is orange, the impact coefficient is 0.2. For example, when the interfering object is a human and the target photographing object is also a human, the impact coefficient is 0.95. When the interfering object is a bird and the target photographing object is a building, the impact coefficient is 0.1.

In a feasible implementation, the impact coefficient may be automatically determined by the photographing device.

It should be understood that the degree of the impact of the interfering object in the candidate image on the candidate image may be preset and stored in one or more mapping tables of the photographing device, and the mapping table represents quantized values of the foregoing various impact factors. The photographing device may first detect existence of the foregoing various impact factors in the candidate image, and then search the mapping table for a quantized value of an impact coefficient corresponding to a detected impact factor. A greater degree of the impact of the interfering object in the candidate image on the candidate image indicates a lower comprehensive score.

It should be understood that when a plurality of impact factors coexist, a quantized value of an impact coefficient corresponding to a comprehensive impact factor may be preset in the mapping table, or a quantized value of an impact coefficient corresponding to a single impact factor may be recorded, and then weighting is performed on quantized values of impact coefficients of various single impact factors, to obtain the quantized value of the impact coefficient of the comprehensive impact factor. This is not limited.

It should be understood that the mapping table may be obtained based on an empirical value, or may be obtained through training in a manner such as machine learning. Documents such as "Clustering Algorithms Research" (Journal of Software, No. 01, 2008), "Research on Reinforcement Learning Technology: A Review" (Acta Automatica Sinica, No. 01, 2004), and "Research on Machine Learning" (Journal of Guangxi Normal University (Natural Science Edition), No. 02, 2003) describe some methods for machine learning in the other approaches, and all content of the documents is incorporated herein by reference. It should be understood that the method for obtaining a quantized value of an impact factor of the interfering object in this embodiment of the present application includes but is not limited to the foregoing method.

In a feasible implementation, the comprehensive score of the candidate image is jointly determined by the composition score and the degree of the impact of the interfering object on the candidate image. For example, assuming that the candidate image has n impact factors of the interfering object, a quantized value of each impact factor is and the composition score of the candidate image is s1, the comprehensive score s2 of the candidate image may be obtained using the following formula:

$$s2 = \max\left(s1 * \left(1 - \sum_{i=1}^{n}(a_i)\right), 0\right), \text{ or}$$

$$s2 = s1 * \prod_{i=1}^{n}(1 - a_i).$$

A beneficial effect of the foregoing embodiment of the present application is as follows. Impact of the interfering object on the composition manner is considered such that a disadvantage of a conventional composition scoring system is overcome, and a preferred composition manner is recommended to the user.

It should be understood that there may be one or more interfering objects in this embodiment of the present application. This is not limited.

In a feasible implementation, the obtained comprehensive score of the candidate image is compared with the preset threshold to determine whether the candidate image meets the preset condition. The preset threshold includes a preset fixed value, or a variable value determined based on at least one of resolution of the candidate image or a size of the candidate image. The variable value is positively correlated to each of the resolution of the candidate image and the size of the candidate image. The preset fixed value may include a preset value corresponding to a photographing scene, or a preset value corresponding to a physical attribute of the target photographing object, or a preset value corresponding to an execution time of the photographing preview mode. The execution time is negatively correlated to the preset value corresponding to the execution time.

For example, different photographing scenes and different target objects correspond to different scores. For example, a score corresponding to a human is 8, a score corresponding to landscape is 7, a score corresponding to a motion scene is 3, and a score corresponding to a macro mode is 5. A longer processing time for searching for optimal framing in the photographing preview mode indicates a lower score threshold. For example, a score corresponding to execution completed immediately is 9, and a score corresponding to execution performed more than 15 seconds is 6. According to this implementation, failed execution convergence caused because a high-quality framing manner cannot be found objectively may be avoided. Higher resolution of the image indicates a higher score threshold. For example, a score corresponding to an image with resolution of 320×480 is 6, and a score corresponding to an image with resolution of 1920×1080 is 8. A larger size of the image indicates a higher score threshold. For example, a score corresponding to an image of 24 inches is 7, and a score corresponding to an image of 12 inches is 5.

It should be understood that an automatic detection function for the photographing scene has been applied to an existing photographing device. After the function is enabled, the photographing device can automatically recognize that a current photographing scene belongs to a portrait, landscape, a night scene, a dynamic scene, or another scene. The photographing scene in this embodiment of the present application may be determined by any automatic detection technology in the other approaches. This is not limited. For example, the method described in patent CN102572238A may be used.

In a feasible implementation, the preset threshold is determined by an empirical value, or may be obtained through training. A specific training implementation is similar to a training manner of the mapping table in the foregoing embodiment. Details are not described again.

Step 2044. Determine the candidate image as the third image when there is one candidate image, and select one candidate image as the third image when there are more than one candidate image.

When there is only one found image meets the preset condition, the candidate image is determined as the third image. When a plurality of found images meets the preset condition, one of the candidate images is selected as the third image.

When a plurality of candidate images meet the preset condition, for example, the third image may be determined in the following several manners.

In a feasible implementation, a candidate image with a highest comprehensive score is selected as the third image, to be specific, comprehensive scores of the candidate images are compared, and the candidate image with the highest score is selected as the third image.

In a feasible implementation, the third image is selected based on third information entered by the user. For example, a user selection interface may be provided in the photographing preview interface, the plurality of candidate images are displayed to the user, and the user selects one of the candidate images as the third image. A form and an entering manner of the third information may be similar to those of the first information. Details are not described again.

Figure 8:
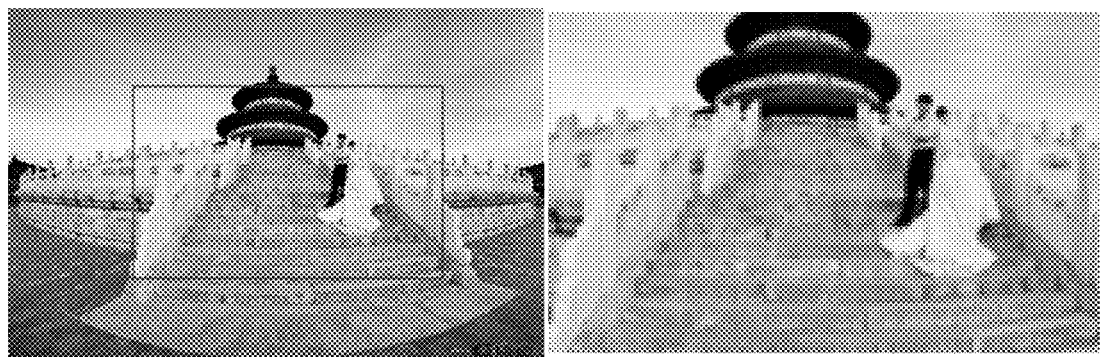
FIG. 8 is a schematic diagram of an example mapped image of a small angle of view image in a large angle of view image according to an embodiment of the present application.

In a feasible implementation, a candidate image closest to or farthest from a mapping location of the small angle of view image in the large angle of view image is selected as the third image. Because the large angle of view image and the small angle of view image have different fields of view, but include the same target photographing object, a mapped image of the small angle of view image may be found in the large angle of view image. As shown in FIG. 8, the right diagram is a small angle of view image, the left diagram is a large angle of view image, and a mapped image of the small angle of view image is in a rectangle of the left diagram. A distance between a candidate image and the mapped image is calculated, and a candidate image closest to or farthest from the mapped image may be selected as the third image.

In a feasible implementation, a candidate image that the user has lowest operation difficulty obtaining is selected as the third image. The operation difficulty for the user is determined based on at least one of angles at which the user rotates the photographing device in a horizontal direction or a vertical direction using a vertical midline and a horizontal midline of the photographing device as axes and angles at which the user clockwise and counterclockwise rotates the photographing device using a lens optical center direction of the photographing device as an axis. For example, operation difficulty in performing rotation at a large angle is greater than operation difficulty in performing rotation at a small angle, and operation difficulty in performing rotation along the lens axis is greater than operation difficulty in performing rotation in the horizontal direction and in the vertical direction. For example, it is more difficult for the user to use the left hand to perform counterclockwise rotation at a same angle than using the right hand. A candidate image that can be obtained by the user with a simplest operation may be selected as the third image. It should be understood that the operation difficulty for the user may be further determined based on another operation performed by the user on the photographing device, for example, a horizontal or vertical movement, or rotation performed along an axis that is not the midline of the device. This is not limited.

It should be understood that the foregoing method for determining the third image may be separately used, or may be used through comprehensive consideration. For example, when at least two candidate images have a same comprehensive score, the third image may be selected based on the third information entered by the user, a candidate image closest to or farthest from the mapping location of the small angle of view image in the large angle of view image is selected as the third image, or a candidate image that the user has lowest operation difficulty in obtaining is selected as the third image.

In a feasible implementation, when at least two candidate images have a same comprehensive score, a candidate image with a highest composition score may be selected as the third image, or a candidate image whose interfering object has a lowest degree of impact on the candidate image is selected as the third image.

A beneficial effect of the foregoing embodiment of the present application is as follows. A plurality of methods for determining a photographing range are provided for the user from different perspectives such that user experience is improved, and a personalized requirement of the user is fully considered when auxiliary composition is provided for the user.

In a feasible implementation, before step 2043, step 2004 further includes the following step.

Step 2042. Determine an interfering object in the large angle of view image.

Similar to the determining a target photographing object in the first image in step 2002, determining an interfering object in the large angle of view image includes determining the interfering object based on second information entered by the user, or determining the interfering object based on a second preset feature.

The second information includes a location point in the large angle of view image, or an area in the large angle of view image, or one or more image feature that can be identified by the photographing device. The second preset feature includes at least one of preset information about a location of the to-be-determined interfering object in the large angle of view image, preset information about an image area occupied by the to-be-determined interfering object in the large angle of view image, a preset geometric feature of the to-be-determined interfering object, a preset color feature of the to-be-determined interfering object, or preset attribute information of the to-be-determined interfering object.

A specific implementation is similar to that of step 2002. Details are not described again.

Step 2005. Display a composition prompt of the third image in a photographing preview interface.

Figure 9:
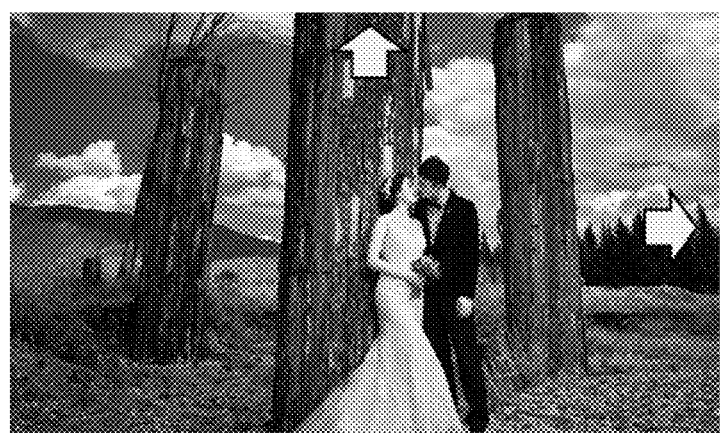
FIG. 9 is a schematic diagram of an example of content displayed in a photographing preview interface according to an embodiment of the present application.

In a feasible implementation, the small angle of view image and first prompt information are displayed in the photographing preview interface. The first prompt information is information used to instruct the user to move the photographing range to a photographing range of the third image. For example, as shown in FIG. 9, a small angle of view image and first prompt information are displayed in a photographing preview interface to instruct the user to move the photographing device to a location of the third image determined in the foregoing step. The first prompt information may be a direction indication arrow, a rotation arrow, an image range frame, a guide line, or another form of prompt information, and the first prompt information may be in a fixed display state, or may be in a blinking state. This is not limited.

It should be understood that the first prompt information may be further a voice prompt or a vibration prompt, and the voice prompt or the vibration prompt and a display prompt may be simultaneously or separately performed. This is not limited.

Figure 10:
FIG. 10 is a schematic diagram of another example of content displayed in a photographing preview interface according to an embodiment of the present application.

In a feasible implementation, the large angle of view image, the third image, the mapped image of the small angle of view image in the large angle of view image, and second prompt information are displayed in the photographing preview interface. The second prompt information is information used to instruct the user to move the photographing range to a photographing range of the third image. For example, as shown in FIG. 10, a large angle of view image is displayed in a photographing preview interface, a location of a third image and a location of a mapped image of a small angle of view image are marked, and second prompt information is displayed, to instruct the user to move the photographing device to the location of the third image determined in the foregoing step. A form and an execution manner of the second prompt information are similar to those of the first prompt information. Details are not described again.

In a feasible implementation, step 2005 further includes, when the user moves the photographing device according to the prompt, display content of the photographing preview interface dynamically varies in real time with content obtained by the photographing device in real time, and the first or second prompt information changes at the same time.

In a feasible implementation, step 2005 further includes, when the photographing range is moved to overlap with the photographing range corresponding to the third image, displaying only the third image in the photographing preview interface. The third image may remain the size, a direction, and the location corresponding to the third image in the large angle of view image, or may be displayed in full screen in the photographing preview interface.

A beneficial effect of the foregoing embodiment of the present application is as follows. A direct and easy-to-understand composition guide is provided for the user, and a real-time dynamic guide is provided for the user in a process in which the user adjusts the photographing range such that user experience and operation convenience are improved.

In a feasible implementation, after the displaying a composition prompt of the third image in a photographing preview interface, the method includes that the photographing device repeatedly performs photographing preview composition guiding according to preset frequency.

It should be understood that in this embodiment of the present application, the third image may be obtained at a time according to various implementations of the foregoing preview composition guiding method, or the various implementations of the foregoing preview composition guiding method may be performed for a plurality of times according to the preset frequency to obtain a final third image.

Further, in a method for obtaining the third image at a time, for example, after the user enables a preview composition guiding function by pressing a key, or the user half presses a shutter, a third image corresponding to optimal composition is calculated according to the various implementations of the foregoing preview composition guiding method. Then, composition calculation is not performed anymore, and the user is guided to a location of the third image calculated before, unless the user manually interrupts the guiding (disables the function, locks a screen, exits a photographing function, or the like), or moves an angle of view of photographing to a place far away from the third image. In this case, a system may need to calculate a composition score again to find the location of the third image. Otherwise, a photographing range corresponding to the third image obtained through calculation is used as a final photographing range. In a guiding process, if the location of the third image in the preview interface needs to be displayed, the location corresponding to the third image in the preview interface needs to be continuously corrected because an angle of view of a lens moves as time goes by.

There may be a plurality of methods for determining the location. For example, a current location of the third image relative to the angle of view of the photographing device may be calculated based on an initially obtained third image and an angle of view of the photographing device when the third image is initially obtained to obtain the location corresponding to the third image in the preview interface. Alternatively, the large angle of view image may be searched for a current location of the initially obtained third image in an image matching manner. In a method for updating and obtaining the third image a plurality of times, the third image corresponding to optimal composition is calculated according to fixed frequency and the various implementations of the foregoing preview composition guiding method to obtain an optimal photographing range in real time. The frequency in this embodiment of the present application may be time frequency, frequency of obtaining an image, frequency of operating the photographing device, change frequency of an angle of view, and the like. This is not limited. For example, the frequency may be every 0.5 second, may be obtaining one frame of image each time, may be rotating the photographing device by 1 degree in a horizontal direction each time, may be that an angle of view for obtaining an image changes by 0.1 degree each time.

It should be understood that in the method for updating and obtaining the third image a plurality of times, a target photographing object determined when the third image is obtained the first time may be inherited, in other words, the target photographing object is not repeatedly obtained in a plurality of subsequent processes of updating and obtaining the third image. In this case, increased complexity caused by repeated determining is avoided, and the target photographing object desired by the user is prevented from being changed and lost in a plurality of times of determining.

In conclusion, a beneficial effect of this embodiment of the present application is as follows. Image information of different angles of view is obtained, and image information around a current photographing range is introduced for reference in order to more properly select a photographing range and a composition manner, avoid causing a new framing problem after the photographing range is adjusted, and avoid a plurality of adjustments made by a user to avoid a framing problem.

Figure 11:
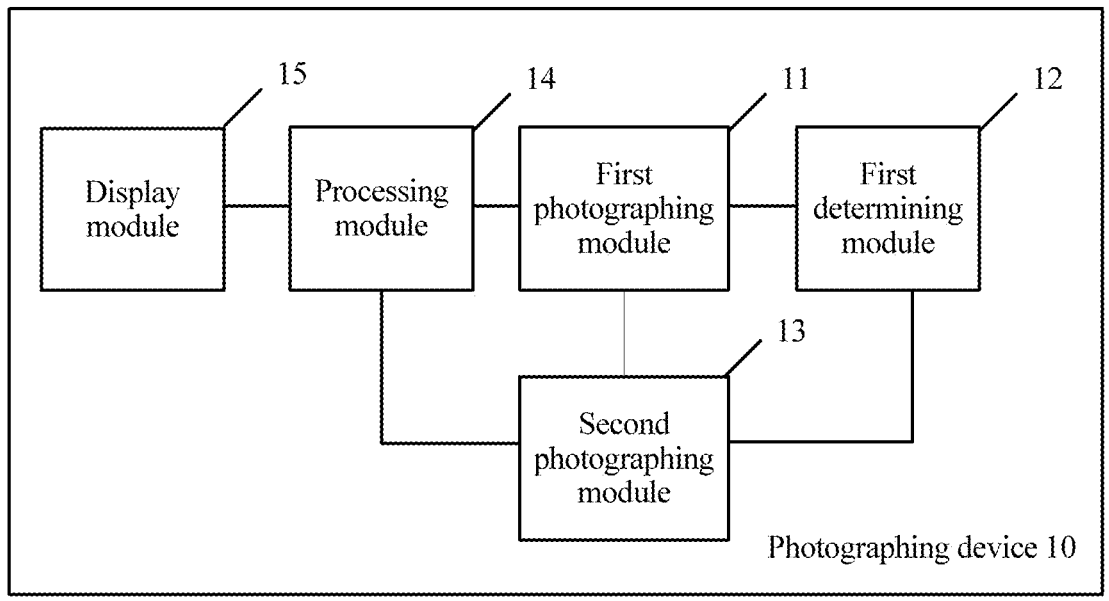
FIG. 11 is a structural block diagram of an example photographing device according to an embodiment of the present application.

FIG. 11 shows an example of a structural block diagram of a photographing device 10 according to an embodiment of the present application, and the photographing device 10 includes a first photographing module 11 configured to obtain a first image in a photographing preview mode, a first determining module 12 configured to determine a target photographing object in the first image, a second photographing module 13 configured to obtain a second image, where the second image includes the target photographing object, the second image and the first image correspond to different angles of view, and the angle of view is used to indicate a photographing range of the photographing device, a processing module 14 configured to construct a third image based on the first image and the second image, where the third image includes the target photographing object, and an angle of view corresponding to the third image is the same as a smaller angle of view in the angles of view corresponding to the first image and the second image, and a display module 15 configured to display a composition prompt of the third image in a photographing preview interface.

In a feasible implementation, the photographing device 10 has at least two lenses. The first image is obtained by a first lens of the photographing device with a first focal length, where the first lens is located in the first photographing module 11. The second image is obtained by a second lens of the photographing device with a second focal length, where the second lens is located in the second photographing module 13. The first focal length is different from the second focal length.

In a feasible implementation, the photographing device 10 simultaneously obtains the first image and the second image.

In a feasible implementation, the first determining module 12 is further configured to determine the target photographing object based on first information entered by a user, or determine the target photographing object based on a first preset feature.

In a feasible implementation, the first information includes a location point in the first image, or an area in the first image, or one or more image features that can be identified by the photographing device 10.

In a feasible implementation, the first preset feature includes at least one of preset information about a location of the to-be-determined target photographing object in the first image, preset information about an image area occupied by the to-be-determined target photographing object in the first image, a preset geometric feature of the to-be-determined target photographing object, a preset color feature of the to-be-determined target photographing object, or preset attribute information of the to-be-determined target photographing object.

Figure 12:
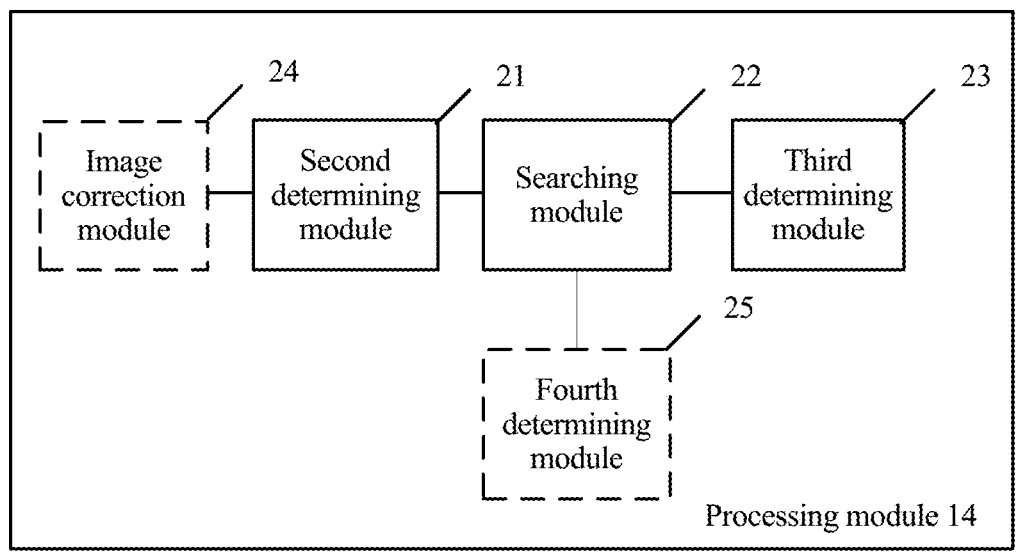
FIG. 12 is a structural block diagram of a processing module according to an embodiment of the present application.

In a feasible implementation, a large angle of view image is an image that is in the first image and the second image and that is corresponding to a larger angle of view, and a small angle of view image is an image that is in the first image and the second image and that is corresponding to the smaller angle of view. As shown in FIG. 12, the processing module 14 includes a second determining module 21 configured to determine a shape and a size of the third image based on the large angle of view image and the small angle of view image, a searching module 22 configured to search, using the shape and the size of the third image as a shape and a size of a search window, the large angle of view image for at least one candidate image that meets a preset condition, and a third determining module 23 configured to determine the candidate image as the third image when there is one candidate image, and select one candidate image as the third image when there are more than one candidate image.

In a feasible implementation, the second determining module 21 is further configured to determine that the shape of the third image is the same as a shape of the small angle of view image obtained after image distortion correction, determine a proportionality coefficient of a size of the small angle of view image relative to a size of the large angle of view image based on a proportional relationship between the first focal length and the second focal length and based on the angles of view respectively corresponding to the large angle of view image and the small angle of view image, and zoom in/out the size of the small angle of view image according to the proportionality coefficient, to obtain the size of the third image.

In a feasible implementation, the processing module 14 further includes an image correction module 24, and the image correction module 24 is configured to perform image distortion correction on the first image and the second image. Correspondingly, the large angle of view image is an image that is in the first image and the second image obtained after image distortion correction and that is corresponding to the larger angle of view, and the small angle of view image is an image that is in the first image and the second image obtained after image distortion correction and that is corresponding to the smaller angle of view.

In a feasible implementation, the preset condition includes that the candidate image includes the target photographing object, and a comprehensive score of the candidate image is higher than a preset threshold. The comprehensive score of the candidate image is positively correlated to a composition score of the candidate image, and is negatively correlated to a degree of impact of an interfering object in the candidate image on the candidate image.

In a feasible implementation, the composition score of the candidate image includes a degree of conformity of a composition manner of the candidate image with at least one of composition rules, a rule of thirds, nine square grid composition, balanced composition, triangle composition, vertical composition, S-type composition, frame composition, diagonal composition, radial composition, open composition, vanishing point composition, face-priority composition, color composition, depth of field composition, or scene composition in a photography composition apparatus.

In a feasible implementation, the degree of the impact of the interfering object in the candidate image on the candidate image includes at least one of an image area covered by the interfering object in the candidate image, a ratio of the image area covered by the interfering object in the candidate image to an image area of the candidate image, a ratio of the image area covered by the interfering object in the candidate image to an image area covered by the target photographing object in the candidate image, a location of the interfering object in the candidate image, a location of the interfering object relative to the target photographing object, or a preset degree of incompatibility between the candidate image and the interfering object.

In a feasible implementation, the preset degree of incompatibility between the candidate image and the interfering object includes a color correlation or difference between the interfering object and the candidate image, or a physical attribute correlation or difference between the interfering object and an object in the candidate image.

In a feasible implementation, the preset threshold includes a preset fixed value, or a variable value determined based on at least one of resolution of the candidate image or a size of the candidate image. The variable value is positively correlated to each of the resolution of the candidate image and the size of the candidate image.

In a feasible implementation, the preset fixed value includes a preset value corresponding to a photographing scene, a preset value corresponding to a physical attribute of the target photographing object, or a preset value corresponding to an execution time of the photographing preview mode. The execution time is negatively correlated to the preset value corresponding to the execution time.

In a feasible implementation, the processing module 14 further includes a fourth determining module 25, and the fourth determining module 25 is configured to determine the interfering object in the large angle of view image.

In a feasible implementation, the fourth determining module 25 is further configured to determine the interfering object based on second information entered by the user, or determine the interfering object based on a second preset feature.

In a feasible implementation, the second information includes a location point in the large angle of view image, or an area in the large angle of view image, or one or more image features that can be identified by the photographing device.

In a feasible implementation, the second preset feature includes at least one of preset information about a location of the to-be-determined interfering object in the large angle of view image, preset information about an image area occupied by the to-be-determined interfering object in the large angle of view image, a preset geometric feature of the to-be-determined interfering object, a preset color feature of the to-be-determined interfering object, or preset attribute information of the to-be-determined interfering object.

In a feasible implementation, the third determining module 23 is further configured to select a candidate image with a highest comprehensive score as the third image, or select the third image based on third information entered by the user, or select a candidate image closest to or farthest from a mapping location of the small angle of view image in the large angle of view image as the third image, or select, as the third image, a candidate image that the user has lowest operation difficulty obtaining. The operation difficulty is determined based on at least one of angles at which the user rotates the photographing device in a horizontal direction or in a vertical direction using a midline of the photographing device as an axis and an angle at which the user rotates the photographing device using a lens optical center direction as an axis.

In a feasible implementation, when at least two candidate images have a same comprehensive score, the third determining module 23 is further configured to select a candidate image with a highest composition score as the third image, or select a candidate image whose interfering object has lowest degree of impact on the candidate image as the third image, or select a candidate image closest to or farthest from the mapping location of the small angle of view image in the large angle of view image as the third image, or select, as the third image, a candidate image that the user has lowest operation difficulty obtaining.

In a feasible implementation, the display module 15 is further configured to display the small angle of view image and first prompt information in the photographing preview interface. The first prompt information is information used to instruct the user to move the photographing range to a photographing range of the third image.

In a feasible implementation, the image displayed in the photographing preview interface varies with the photographing range in real time.

In a feasible implementation, the display module 15 is further configured to display the large angle of view image, the third image, a mapped image of the small angle of view image in the large angle of view image, and second prompt information in the photographing preview interface. The second prompt information is information used to instruct the user to move the photographing range from the mapped image to a photographing range of the third image.

In a feasible implementation, instruction information of the mapped image displayed in the photographing preview interface varies with the photographing range in real time.

In a feasible implementation, when the photographing range is moved to overlap with the photographing range corresponding to the third image, only the third image is displayed in the photographing preview interface.

In a feasible implementation, after the composition prompt of the third image is displayed in the photographing preview interface, the photographing device repeatedly performs photographing preview composition guiding according to preset frequency.

It should be understood that the photographing device 10 and the modules are configured to execute the method of corresponding steps shown in FIG. 2 of the present application. A specific implementation and a beneficial effect are similar to those of the photography composition guiding method shown in FIG. 2. Details are not described again.

Figure 13:
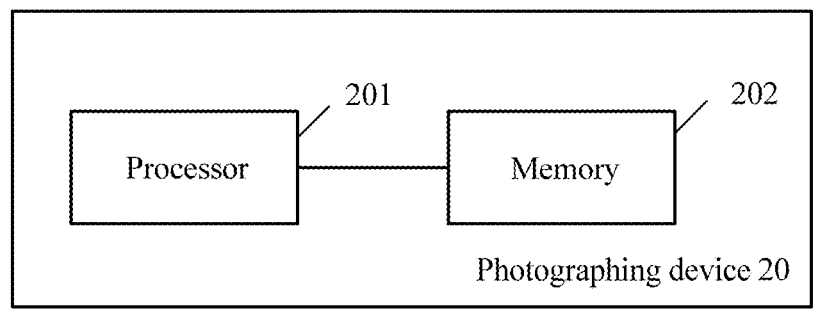
FIG. 13 is a structural block diagram of still another example photographing device according to an embodiment of the present application.

FIG. 13 shows an example of a structural block diagram of a photographing device 20 according to an embodiment of the present application. The photographing device 20 includes a processor 201 and a memory 202. The memory 202 may be configured to store cache needed for data processing performed by the processor 201, and may be further configured to provide data invoked for data processing performed by the processor 201 and provide storage space for obtained result data.

In this embodiment of the present application, the processor 201 is configured to perform, by invoking program code stored in the memory 202, operations of corresponding steps shown in FIG. 2 of the present application. A specific implementation and a beneficial effect are similar to those of the photography composition guiding method shown in FIG. 2. Details are not described again.

It should be noted that, the apparatus division is merely logical function division, but is not limited to the foregoing division, as long as corresponding functions can be implemented. In addition, specific names of the functional units are merely provided for the purpose of distinguishing the units from one another, but are not intended to limit the protection scope of the present application.

In addition, persons of ordinary skill in the art may understand that all or some of the steps of the method embodiments may be implemented by a program instructing relevant hardware. The program may be stored in a computer readable storage medium. The storage medium may be a read-only memory, a magnetic disk, an optical disc, or the like.

The foregoing descriptions are merely example implementations of the present application, but are not intended to limit the protection scope of the present application. Any variation or replacement readily figured out by persons skilled in the art within the technical scope disclosed in the embodiments of the present application shall fall within the protection scope of the present application. Therefore, the protection scope of the present application shall be subject to the protection scope of the claims.

What is claimed is:

1. A photographing preview composition guiding method, comprising:
    obtaining a first image in a photographing preview mode of a photographing device;
    determining a target photographing object in the first image;
    obtaining a second image, wherein the second image comprises the target photographing object, wherein the second image and the first image correspond to different angles of view, and wherein an angle of view indicates a photographing range of the photographing device;
    constructing a third image based on the first image and the second image, wherein the third image comprises the target photographing object, wherein an angle of view corresponding to the third image is the same as a smaller angle of view in the angles of view corresponding to the first image and the second image, and wherein constructing the third image based on the first image and the second image comprises determining a shape and a size of the third image based on a large angle of view image and a small angle of view image; and displaying a composition prompt of the third image in a photographing preview interface.

2. The photographing preview composition guiding method of claim 1, wherein the photographing device has at least two lenses, wherein the first image is obtained by a first lens of the photographing device with a first focal length, wherein the second image is obtained by a second lens of the photographing device with a second focal length, and wherein the first focal length is different from the second focal length.

3. The photographing preview composition guiding method of claim 1, wherein the photographing device simultaneously obtains the first image and the second image.

4. The photographing preview composition guiding method of claim 1, wherein determining the target photographing object in the first image comprises:
   determining the target photographing object based on first information received from a user; or
   determining the target photographing object based on a first preset feature.

5. The photographing preview composition guiding method of claim 4, wherein the first information comprises:
   a location point in the first image;
   an area in the first image; or
   at least one image feature identified by the photographing device.

6. The photographing preview composition guiding method of claim 4, wherein the first preset feature comprises at least one of:
   preset information about a location of a to-be-determined target photographing object in the first image;
   preset information about an image area occupied by the to-be-determined target photographing object in the first image;
   a preset geometric feature of the to-be-determined target photographing object;
   a preset color feature of the to-be-determined target photographing object; or
   preset attribute information of the to-be-determined target photographing object.

7. The photographing preview composition guiding method of claim 1, wherein the large angle of view image is an image in the first image and the second image and corresponding to a larger angle of view, wherein the small angle of view image is an image in the first image and the second image and corresponding to the smaller angle of view, and wherein constructing the third image based on the first image and the second image further comprises:
   searching, using the shape and the size of the third image as a shape and a size of a search window, the large angle of view image for at least one candidate image meeting a preset condition;
   determining the at least one candidate image as the third image when there is one candidate image; and
   selecting one candidate image as the third image when there are more than one candidate image.

8. The photographing preview composition guiding method of claim 1, wherein determining the shape and the size of the third image comprises:
   determining that the shape of the third image is the same as a shape of the small angle of view image obtained after image distortion correction;
   determining a proportionality coefficient of a size of the small angle of view image relative to a size of the large angle of view image based on a proportional relationship between the first focal length and the second focal length and based on the angles of view respectively corresponding to the large angle of view image and the small angle of view image; and
   zooming in or zooming out the size of the small angle of view image according to the proportionality coefficient to obtain the size of the third image.

9. The photographing preview composition guiding method of claim 1, wherein before determining the shape and the size of the third image, the photographing preview composition guiding method further comprises performing image distortion correction on the first image and the second image, wherein the large angle of view image is an image in the first image and the second image obtained after the image distortion correction and corresponding to the larger angle of view, and wherein the small angle of view image is an image in the first image and the second image obtained after the image distortion correction and corresponding to the smaller angle of view.

10. The photographing preview composition guiding method of claim 7, wherein the preset condition comprises that the at least one candidate image comprises the target photographing object, wherein a comprehensive score of the at least one candidate image is higher than a preset threshold, and wherein the comprehensive score of the at least one candidate image is positively correlated to a composition score of the at least one candidate image and negatively correlated to a degree of impact of an interfering object in the at least one candidate image on the at least one candidate image.

11. The photographing preview composition guiding method of claim 10, wherein the composition score of the at least one candidate image comprises a degree of conformity of a composition manner of the at least one candidate image with at least one of composition rules comprising a rule of thirds, nine square grid composition, balanced composition, triangle composition, vertical composition, S-type composition, frame composition, diagonal composition, radial composition, open composition, vanishing point composition, face-priority composition, color composition, depth of field composition, or scene composition in a photography composition method.

12. The photographing preview composition guiding method of claim 10, wherein the degree of the impact of the interfering object in the at least one candidate image on the at least one candidate image comprises at least one of:
   an image area covered by the interfering object in the at least one candidate image;
   a ratio of the image area covered by the interfering object in the at least one candidate image to an image area of the at least one candidate image;
   a ratio of the image area covered by the interfering object in the at least one candidate image to an image area covered by the target photographing object in the at least one candidate image;
   a location of the interfering object in the at least one candidate image;
   a location of the interfering object relative to the target photographing object; or
   a preset degree of incompatibility between the at least one candidate image and the interfering object.

13. The photographing preview composition guiding method of claim 12, wherein the preset degree of incompatibility between the at least one candidate image and the interfering object comprises:
   a color correlation or difference between the interfering object and the at least one candidate image; or a physical attribute correlation or difference between the interfering object and an object in the at least one candidate image.

14. The photographing preview composition guiding method of claim 10, wherein the preset threshold comprises:
a preset fixed value; or
a variable value determined based on at least one of resolution of the at least one candidate image or a size of the at least one candidate image, wherein the variable value is positively correlated to each of the at least one resolution of the at least one candidate image and the size of the at least one candidate image.

15. The photographing preview composition guiding method of claim 14, wherein the preset fixed value comprises:
a preset value corresponding to a photographing scene;
a preset value corresponding to a physical attribute of the target photographing object; or
a preset value corresponding to an execution time of the photographing preview mode, wherein the execution time is negatively correlated to the preset value corresponding to the execution time.

16. The photographing preview composition guiding method of claim 7, wherein before searching the large angle of view image for the at least one candidate image meeting the preset condition, the photographing preview composition guiding method further comprises determining an interfering object in the large angle of view image.

17. The photographing preview composition guiding method of claim 16, wherein determining the interfering object in the large angle of view image comprises:
determining the interfering object based on second information received from a user; or
determining the interfering object based on a second preset feature.

18. The photographing preview composition guiding method of claim 17, wherein the second information comprises:
a location point in the large angle of view image;
an area in the large angle of view image; or
at least one image feature identified by the photographing device.

19. The photographing preview composition guiding method of claim 17, wherein the second preset feature comprises at least one of:
preset information about a location of a to-be-determined interfering object in the large angle of view image;
preset information about an image area occupied by the to-be-determined interfering object in the large angle of view image;
a preset geometric feature of the to-be-determined interfering object;
a preset color feature of the to-be-determined interfering object; or
preset attribute information of the to-be-determined interfering object.

20. The photographing preview composition guiding method of claim 7, wherein selecting the one candidate image as the third image when there are more than one candidate image comprises:
selecting a candidate image with a highest comprehensive score as the third image;
selecting the third image based on third information received from a user;
selecting a candidate image closest to or farthest from a mapping location of the small angle of view image in the large angle of view image as the third image; or
selecting, as the third image, a candidate image that the user has lowest operation difficulty in obtaining, wherein the operation difficulty is determined based on at least one of angles at which the user rotates the photographing device in a horizontal direction or in a vertical direction using a midline of the photographing device as an axis and an angle at which the user rotates the photographing device using a lens optical center direction as an axis.

* * * * *